US012664652B1

(12) United States Patent (10) Patent No.: US 12,664,652 B1
Feng et al. (45) Date of Patent: Jun. 23, 2026

(54) DEEP LEARNING METHOD, APPARATUS, DEVICE, AND MEDIUM FOR JOINT OPTIMIZATION BASED ON VASCULAR CENTERLINE GUIDANCE

(71) Applicant: Hangzhou Deepwise & League of PHD Technology Co., Ltd., Hangzhou City (CN)

(72) Inventors: Hui Feng, Hangzhou (CN); Fandong Zhang, Hangzhou (CN); Yizhou Yu, Hangzhou (CN); Yiming Li, Hangzhou (CN); Xin Qiao, Hangzhou (CN)

( * ) Notice: Subject to any disclaimer, the term of this patent is extended or adjusted under 35 U.S.C. 154(b) by 0 days.

(21) Appl. No.: 19/315,393

(22) Filed: Aug. 29, 2025

(30) Foreign Application Priority Data

Apr. 14, 2025 (CN) .......................... 202510461979.0

(51) Int. Cl.
| | |
|---|---|
| *G06T 7/00* | (2017.01) |
| *G06T 7/155* | (2017.01) |
| *G06T 9/00* | (2006.01) |
| *G06V 10/25* | (2022.01) |
| *G06V 10/42* | (2022.01) |
| *G06V 10/44* | (2022.01) |
| *G06V 10/80* | (2022.01) |

(52) U.S. Cl.
CPC ............ *G06T 7/0012* (2013.01); *G06T 7/155* (2017.01); *G06T 9/00* (2013.01); *G06V 10/25* (2022.01); *G06V 10/42* (2022.01); *G06V 10/44* (2022.01); *G06V 10/806* (2022.01); *G06T 2207/20036* (2013.01); *G06T 2207/30104* (2013.01)

(58) Field of Classification Search
CPC ................... G06T 7/0012; G06T 7/155; G06T 2207/30104; G06V 10/25; G06V 10/806; G06V 10/42; G06V 10/44; G06V 9/00
See application file for complete search history.

(56) References Cited

PUBLICATIONS

Zhang, X., Cheng, G., Han, X., Li, S., Xiong, J., Wu, Z., . . . & Chen, D. (2023). Deep learning-based multi-stage postoperative type-b aortic dissection segmentation using global-local fusion learning. Physics in Medicine & Biology, 68(23), 235011. (Year: 2023).*

* cited by examiner

*Primary Examiner* — David Perlman
(74) *Attorney, Agent, or Firm* — Novoclaims Patent Services LLC; Mei Lin Wong

(57) ABSTRACT

This disclosure provides a deep learning method, apparatus, device, and medium for task joint optimization based on vascular centerline guidance, including: in a process of extracting a global image feature by an encoder, extracting a local image feature after performing data augmentation on a local image with morphological specificity based on the vascular centerline guidance, and fusing the local image feature with the global image feature to form a fused image feature; and forming a bi-directional feature correction process between decoders of different decoding branches. The vascular centerline guidance is used to provide gated feature optimization and computational efficiency adjustment for an encoding process. Specific morphological data of the vascular centerline guidance is used to form a control mechanism for modulating efficiency of local feature extraction. A scarcity problem of hemodynamic annotations has been alleviated and generalization ability of a model has been enhanced.

25 Claims, 11 Drawing Sheets

100

In process of extracting global image feature by encoder, extract local image feature after performing data augmentation on local image with morphological specificity based on vascular centerline guidance, and fuse local image feature with global image feature to form fused image feature 100a Form bi-directional feature correction process between decoders of different decoding branches

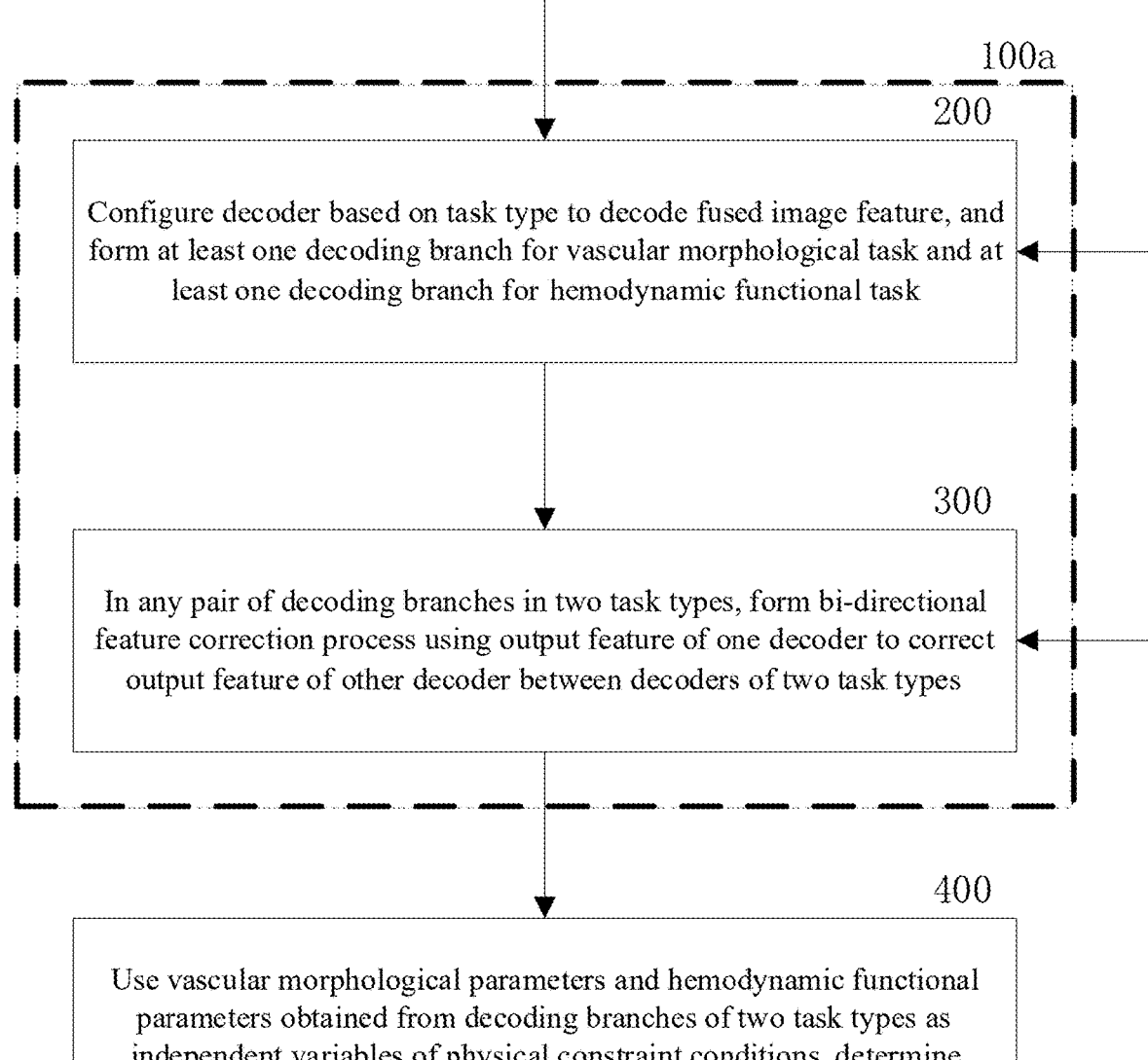

In process of extracting global image feature by encoder, extract local image feature after performing data augmentation on local image with morphological specificity based on vascular centerline guidance, and fuse local image feature with global image feature to form fused image feature 100a

200

Configure decoder based on task type to decode fused image feature, and form at least one decoding branch for vascular morphological task and at least one decoding branch for hemodynamic functional task

300

In any pair of decoding branches in two task types, form bi-directional feature correction process using output feature of one decoder to correct output feature of other decoder between decoders of two task types

400

Use vascular morphological parameters and hemodynamic functional parameters obtained from decoding branches of two task types as independent variables of physical constraint conditions, determine physical constraint loss function as component of total loss function based on residual between predicted value of dependent variable and true value of dependent variable under physical constraint conditions, and optimize decoder and bi-directional feature correction process through gradient backpropagation of total loss function

DEEP LEARNING METHOD, APPARATUS, DEVICE, AND MEDIUM FOR JOINT OPTIMIZATION BASED ON VASCULAR CENTERLINE GUIDANCE

This application claims priority to Chinese Patent Application No. 2025104619790, filed on Apr. 14, 2025, titled "DEEP LEARNING METHOD, APPARATUS, DEVICE, AND MEDIUM FOR JOINT OPTIMIZATION BASED ON VASCULAR CENTERLINE GUIDANCE". The entire content of which is incorporated herein by reference in their entirety.

TECHNICAL FIELD

This disclosure relates to the field of deep learning technologies for medical images, and in particular to, a deep learning method, apparatus, device, and medium for task joint optimization based on vascular centerline guidance.

BACKGROUND OF THE INVENTION

Accurate assessment of myocardial hemodynamic abnormalities caused by coronary artery stenosis typically adopts an invasive method to obtain hemodynamic functional parameters of gold standards such as fractional flow reserve (FFR) and instantaneous free wave ratio (iFR). CTA (Computed Tomography Angiography) technologies for contrast image are used to construct vascular geometric models in a non-invasive manner. However, there are limitations in analyzing functional ischemia degree solely from an anatomical perspective of vascular features to quantify hemodynamic functional indicators. By using computational fluid dynamics technologies such as CT-FFR (Computed Tomography-Fractional Flow Reserve) and QFR (Quantitative Flow Ratio), it is possible to simulate hemodynamic status of real blood vessels by providing physiological boundary conditions and status parameters based on the vascular geometric models, in order to quantify characteristic parameters of hemodynamic functions at a target position. Existing deep learning technologies may form segmentation detection models for vascular morphology and functional prediction models for hemodynamics, and quickly perform a targeted assessment of vascular morphology or hemodynamic function of target blood vessels in combination with specific baseline data of a patient.

In deep learning technologies, segmentation tasks for the vascular morphology and regression tasks for the hemodynamic function typically include an encoder structure for extracting features and a decoder structure for restoring spatial dimensions or forming regression trends. Task training usually adopts a separate learning paradigm. That is to say, for a single task requirement, segmentation models or prediction models for vascular morphology segmentation are constructed with independent training data, objective functions, feature extraction modules, segmentation detection modules, or regression prediction modules.

Based on prior knowledge of fluid mechanics, it may be understood that there is a complex and credible correlation between changes in the hemodynamic function and changes in the vascular morphology. On the one hand, positions exhibiting sudden changes in vascular morphological geometric parameters frequently trigger changes in the hemodynamic functional parameters. On the other hand, drastic changes in the hemodynamic functional parameters may be used to infer changes in the vascular morphological geometric parameters. However, in the prior art, a cascade mode is usually adopted to connect a detection model and a regression model step by step, and the vascular morphology and the hemodynamic function are discretely processed and gradually assessed.

It can be seen that a mode that treats vascular anatomical segmentation detection and hemodynamic functional prediction as independent tasks will lead to the following key deficiencies.

Firstly, a pathological correlation between vascular anatomical morphology and the hemodynamic functional parameters has not been effectively modeled, resulting in a weakened model correlation. Meanwhile, lack of details in training data amplifies cascading errors between models, which may easily lead to inconsistent diagnostic conclusions, for example, anatomical stenosis is significant but the hemodynamic parameters do not reach an ischemic threshold.

Secondly, annotation data for each task during a training process is not synergistically optimized and scarcity of hemodynamic annotations can limit generalization ability of the model.

Thirdly, there is no emphasis on specific anatomical morphology of blood vessels during the training process, which may affect model efficiency and accuracy.

Although there are also joint training modes for multitasking, more attention has been paid to functional abnormality detection and physiological condition estimation, resulting in neglect of physical consistency between anatomical reconstruction and functional prediction.

SUMMARY

In view of the above problems, embodiments of this disclosure provide a deep learning method, apparatus, device, and medium for task joint optimization based on vascular centerline guidance, which solves a technical problem of inability to form specific recognition of vascular morphology and use physical consistency of hemodynamic function to synergistically promote and improve overall analysis accuracy in existing abnormal analysis models of myocardial hemodynamics.

A deep learning method for task joint optimization based on vascular centerline guidance in the embodiments of this disclosure includes:

in a process of extracting a global image feature by an encoder, extracting a local image feature after performing data augmentation on a local image with morphological specificity based on the vascular centerline guidance, and fusing the local image feature with the global image feature to form a fused image feature; and forming a bi-directional feature correction process between decoders of different decoding branches.

In one embodiment of this disclosure, the forming the bi-directional feature correction process between the decoders of different decoding branches includes:

configuring a decoder based on a task type to decode the fused image feature, and forming at least one decoding branch for a vascular morphological task and at least one decoding branch for a hemodynamic functional task; and in any pair of decoding branches in two task types, forming the bi-directional feature correction process using an output feature of one decoder to correct an output feature of the other decoder between the decoders of the two task types.

In one embodiment of this disclosure, the forming the fused image feature includes:

performing global sampling on an input image containing a blood vessel to form a global ROI based on the vascular centerline guidance;

extracting the global image feature from the global ROI by the encoder;

determining position attention information based on a vascular specificity judgment rule in the global ROI, and performing local sampling to form a local ROI dataset based on the position attention information in the global ROI;

after performing up-sampling and the data augmentation on the local ROI, extracting the local image feature using an additional encoder, and performing positional encoding on the local image feature using a vascular centerline; and fusing the local image feature with the global image feature using an attention mechanism to form the fused image feature.

In one embodiment of this disclosure, the vascular specificity judgment rule includes judging vascular stenosis rate, vascular bifurcation, and vascular curvature.

In one embodiment of this disclosure, replace the determining the position attention information based on the vascular specificity judgment rule in the global ROI, and the performing the local sampling to form the local ROI dataset based on the position attention information in the global ROI by:

adjusting the local ROI to perform the local sampling to form the local ROI dataset in the global ROI, and determining the position attention information of the local ROI containing specific vascular morphology based on the vascular specificity judgment rule.

In one embodiment of this disclosure, the up-sampling is provided based on a resolution level of fusion of the local image feature and the global image feature.

In one embodiment of this disclosure, the additional encoder adopts cascaded 3D convolution to extract the local feature and fuse it with positional encoding of a vascular centerline point to obtain the local image feature.

In one embodiment of this disclosure, a size of the local ROI is dynamically adjusted based on the vascular specificity judgment rule.

In one embodiment of this disclosure, the vascular centerline includes stenosis information, obtained by one of the following methods:

in the case that the centerline is known, obtain a cross-sectional diameter adopting cross-sectional 2D-Unet segmentation, and calculate stenosis degree along the centerline, and in the case that the centerline is unknown, segment an entire image and extract coordinates of the centerline adopting lightweight 3D-Unet, and calculate vascular stenosis along the centerline.

In one embodiment of this disclosure, the configuring the decoder based on the task type to decode the fused image feature, and the forming the at least one decoding branch for the vascular morphological task and the at least one decoding branch for the hemodynamic functional task include:

providing a segmentation decoding branch reflecting the vascular morphological task, and providing a segmentation decoder corresponding to a same level encoder in the segmentation decoding branch, where the vascular morphological task includes at least one of contour, inner diameter, inner wall mask, or topological shape; and providing a prediction decoding branch reflecting the hemodynamic functional task, and providing a prediction decoder corresponding to a same level encoder in the prediction decoding branch, where the hemodynamic functional task includes at least one of blood pressure parameters, blood flow parameters, and CTFFR.

In one embodiment of this disclosure, input features of the bi-directional feature correction process include a feature output of a same level decoder as a corrected feature, and further include a feature output of a same level decoder as a control feature, a feature output of a preceding level decoder, or a down-sampling feature output of a final output result of a task, and then an interactive judgment is formed using the control feature to control the bi-directional feature correction process.

In one embodiment of this disclosure, the bi-directional feature correction process includes:

establishing a forward correction process between two decoders corresponding to the task type of the decoding branch to correct a functional feature based on a morphological feature; and meanwhile, establishing a reverse correction process between the two decoders to correct the morphological feature based on the functional feature.

In one embodiment of this disclosure, the forward correction process includes:

generating a spatial attention weight based on a segmentation confidence map of the morphological feature, and dynamically modulating a functional feature map to obtain a corrected functional feature.

In one embodiment of this disclosure, the reverse correction process includes:

correcting the morphological feature based on changes in the functional feature (such as in a gradient direction) to obtain a corrected morphological feature.

In one embodiment of this disclosure, the forming the bi-directional feature correction process includes:

establishing a forward correction process between the two decoders corresponding to the task type of the decoding branch based on the morphological feature and a vascular centerline distance heatmap to correct the functional feature; and meanwhile, establishing a reverse correction process between the two decoders to correct the morphological feature based on the functional feature and a hemodynamic direction of the vascular centerline guidance.

In one embodiment of this disclosure, the forming the bi-directional feature correction process includes:

providing a measurement threshold for average confidence of the morphological feature during a gated judgment process, and determining whether to activate the bi-directional feature correction process based on a measurement result.

In one embodiment of this disclosure, the providing the measurement threshold for the average confidence of the morphological feature during the gated judgment process, and the determining whether to activate the bi-directional feature correction process based on the measurement result include:

obtaining a morphological feature to be corrected, a functional feature to be corrected, a control segmentation feature, and a control function feature, and forming a confidence map and the average confidence based on the control function feature;

in the case that the average confidence is greater than the measurement threshold, directly outputting the morphological feature to be corrected and the functional feature to be corrected from the segmentation decoder and the prediction decoder, respectively; and in the case that the average confidence is less than the measurement threshold, activating the bi-directional feature correction process.

In one embodiment of this disclosure, the forming the bi-directional feature correction process includes:

outputting a confidence map (Conf Map) of a determined channel and the vascular centerline distance heatmap or performing 3×3×3 convolution on the control function feature (F_control) based on the confidence map (Conf Map) and the vascular centerline distance heatmap to form functional correction data;

outputting a functional gradient (FFR Grad) of a same channel and overlaying with the hemodynamic direction of the vascular centerline guidance or performing the 3×3×3 convolution on a control separation feature (S_control) based on the functional gradient (FFR Grad) and the hemodynamic direction of the vascular centerline guidance to form morphological correction data;

correcting the morphological feature to be corrected (S_feat) based on the morphological correction data to form a corrected morphological feature (S_feat_cor); and correcting the functional feature to be corrected (F_feat) based on the functional correction data to form a corrected functional feature (F_feat_cor).

In one embodiment of this disclosure, it further includes:

using vascular morphological parameters and hemodynamic functional parameters obtained from the decoding branches of the two task types as independent variables of physical constraint conditions, determining a physical constraint loss function as a component of a total loss function based on a residual between a predicted value of a dependent variable and a true value of the dependent variable under the physical constraint conditions, and optimizing the decoder and the bi-directional feature correction process through gradient backpropagation of the total loss function.

In one embodiment of this disclosure, the determining the physical constraint loss function as the component of the total loss function, and the optimizing the decoder and the bi-directional feature correction process through the gradient backpropagation of the total loss function include:

determining a segmentation loss function based on a residual between a prediction result of a segmentation task and a segmentation true value;

determining a prediction loss function based on a residual between a prediction result of a prediction task and a predicted true value;

selecting a segmentation task and a CTFFR prediction task, using a segmentation task result to obtain vascular radius parameters and obtain pressure differential parameters from a CTFFR prediction task result, using the vascular radius parameters and the pressure differential parameters to obtain a predicted blood flow value through a Poiseuille flow equation, using the vascular radius parameters and the pressure differential parameters to form a vascular blood flow true value through a fluid continuity equation, and determining the physical constraint loss function based on a residual between the predicted blood flow value and the vascular blood flow true value; and forming a total loss based on segmentation loss, prediction loss, and physical constraint loss, and optimizing network parameters of the decoder and the bi-directional feature correction process through the gradient backpropagation using the total loss function.

The deep learning apparatus for joint optimization based on vascular centerline guidance in the embodiments of this disclosure includes:

an encoder configured to, in a process of extracting a global image feature by an encoder, extract a local image feature after performing data augmentation on a local image with morphological specificity based on the vascular centerline guidance, and fuse the local image feature with the global image feature to form a fused image feature; and a decoder correction module configured to, form a bi-directional feature correction process between decoders of different decoding branches.

In one embodiment of this disclosure, the decoder correction module includes:

a decoder configured to, configure a decoder based on a task type to decode the fused image feature, and form at least one decoding branch for a vascular morphological task and at least one decoding branch for a hemodynamic functional task; and a bi-directional correction decoder configured to, in any pair of decoding branches in two task types, form the bi-directional feature correction process using an output feature of one decoder to correct an output feature of the other decoder between the decoders of the two task types.

In one embodiment of this disclosure, the encoder includes:

a global image sampling unit configured to, perform global sampling on an input image containing a blood vessel to form a global ROI based on the vascular centerline guidance;

a global feature extraction unit configured to, extract the global image feature from the global ROI by the encoder;

a local image selection unit configured to, determine position attention information based on a vascular specificity judgment rule in the global ROI, and perform local sampling to form a local ROI dataset based on the position attention information in the global ROI;

a local feature extraction unit configured to, after performing up-sampling and the data augmentation on the local ROI, extract the local image feature using an additional encoder, and perform positional encoding on the local image feature using a vascular centerline; and a fused feature formation unit configured to, fuse the local image feature with the global image feature using an attention mechanism to form the fused image feature.

In one embodiment of this disclosure, in the local image selection unit, the vascular specificity judgment rule includes judging vascular stenosis rate, vascular bifurcation, and vascular curvature.

In one embodiment of this disclosure, replace the local image selection unit by adjusting the local ROI to perform the local sampling to form the local ROI dataset in the global ROI, and determining the position attention information of the local ROI containing specific vascular morphology based on the vascular specificity judgment rule.

In one embodiment of this disclosure, in the local feature extraction unit, the up-sampling is provided based on a resolution level of fusion of the local image feature and the global image feature.

In one embodiment of this disclosure, in the local feature extraction unit, the additional encoder adopts cascaded 3D convolution to extract the local feature and fuse it with positional encoding of a vascular centerline point to obtain the local image feature.

In one embodiment of this disclosure, in the local image selection unit, a size of the local ROI is dynamically adjusted based on the vascular specificity judgment rule.

In one embodiment of this disclosure, in the global image sampling unit, the vascular centerline includes stenosis information, obtained by one of the following methods:

in the case that the centerline is known, obtain a cross-sectional diameter adopting cross-sectional 2D-Unet segmentation, and calculate stenosis degree along the centerline, and in the case that the centerline is unknown, segment an entire image and extract coordinates of the centerline adopting lightweight 3D-Unet, and calculate vascular stenosis along the centerline.

In one embodiment of this disclosure, the decoder includes:

a segmentation task provision unit 21 configured to, provide a segmentation decoding branch reflecting the vascular morphological task, and provide a segmentation decoder corresponding to a same level encoder in the segmentation decoding branch; where the vascular morphological task includes at least one of contour, inner diameter, inner wall mask, or topological shape; and a prediction task provision unit 22 configured to, provide a prediction decoding branch reflecting the hemodynamic functional task, and provide a prediction decoder corresponding to a same level encoder in the prediction decoding branch; where the hemodynamic functional task includes at least one of blood pressure parameters, blood flow parameters, and CTFFR.

In one embodiment of this disclosure, in the bi-directional correction decoder, input features of the bi-directional feature correction process include a feature output of a same level decoder as a corrected feature, and further include a feature output of a same level decoder as a control feature, a feature output of a preceding level decoder, or a down-sampling feature output of a final output result of a task, and then an interactive judgment is formed using the control feature to control the bi-directional feature correction process.

In one embodiment of this disclosure, the bi-directional correction decoder includes:

a forward correction unit configured to, establish a forward correction process between two decoders corresponding to the task type of the decoding branch to correct a functional feature based on a morphological feature; and a reverse correction unit configured to, meanwhile, establish a reverse correction process between the two decoders to correct the morphological feature based on the functional feature.

In one embodiment of this disclosure, in the forward correction unit, the forward correction process includes:

generating a spatial attention weight based on a segmentation confidence map of the morphological feature, and dynamically modulating a functional feature map to obtain a corrected functional feature.

In one embodiment of this disclosure, in the reverse correction unit, the reverse correction process includes:

correcting the morphological feature based on changes in the functional feature (such as in a gradient direction) to obtain a corrected morphological feature.

In one embodiment of this disclosure, the bi-directional correction decoder further includes:

a forward correction enhancement unit configured to, establish a forward correction process between the two decoders corresponding to the task type of the decoding branch based on the morphological feature and a vascular centerline distance heatmap to correct the functional feature; and a reverse correction enhancement unit configured to, meanwhile, establish a reverse correction process between the two decoders to correct the morphological feature based on the functional feature and a hemodynamic direction of the vascular centerline guidance.

In one embodiment of this disclosure, the bi-directional correction decoder further includes:

a gated switch unit configured to, provide a measurement threshold for average confidence of the morphological feature during a gated judgment process, and determine whether to activate the bi-directional feature correction process based on a measurement result.

In one embodiment of this disclosure, the bi-directional correction decoder further includes:

a confidence acquisition unit configured to, obtain a morphological feature to be corrected, a functional feature to be corrected, a control segmentation feature, and a control function feature, and form a confidence map and the average confidence based on the control function feature;

a feature direct connection unit configured to, in the case that the average confidence is greater than the measurement threshold, directly output the morphological feature to be corrected and the functional feature to be corrected from the segmentation decoder and the prediction decoder, respectively; and a bi-directional correction execution unit configured to, in the case that the average confidence is less than the measurement threshold, activate the bi-directional feature correction process.

In one embodiment of this disclosure, in the gated switch unit, the forming the bi-directional feature correction process includes:

outputting a confidence map (Conf Map) of a determined channel and the vascular centerline distance heatmap or performing 3×3×3 convolution on the control function feature (F_control) based on the confidence map (Conf Map) and the vascular centerline distance heatmap to form functional correction data;

outputting a functional gradient (FFR Grad) of a same channel and overlaying with the hemodynamic direction of the vascular centerline guidance or performing the 3×3×3 convolution on a control separation feature (S_control) based on the functional gradient (FFR Grad) and the hemodynamic direction of the vascular centerline guidance to form morphological correction data;

correcting the morphological feature to be corrected (S_feat) based on the morphological correction data to form a corrected morphological feature (S_feat_cor); and correcting the functional feature to be corrected (F_feat) based on the functional correction data to form a corrected functional feature (F_feat_cor).

In one embodiment of this disclosure, it further includes:

a physical constraint formation module configured to, use vascular morphological parameters and hemodynamic functional parameters obtained from the decoding branches of the two task types as independent variables of physical constraint conditions, determine a physical constraint loss function as a component of a total loss function based on a residual between a predicted value of a dependent variable and a true value of the dependent variable under the physical constraint conditions, and optimize the decoder and the bi-directional feature correction process through gradient backpropagation of the total loss function.

In one embodiment of this disclosure, the physical constraint formation module includes:

a segmentation loss formation unit configured to, determine a segmentation loss function based on a residual between a prediction result of a segmentation task and a segmentation true value;

a prediction loss formation unit configured to, determine a prediction loss function based on a residual between a prediction result of a prediction task and a predicted true value;

a physical constraint loss formation unit configured to, select a segmentation task and a CTFFR prediction task, use a segmentation task result to obtain vascular radius parameters and obtain pressure differential parameters from a CTFFR prediction task result, use the vascular radius parameters and the pressure differential parameters to obtain a predicted blood flow value through a Poiseuille flow equation, use the vascular radius parameters and the pressure differential parameters to form a vascular blood flow true value through a fluid continuity equation, and determine the physical constraint loss function based on a residual between the predicted blood flow value and the vascular blood flow true value; and an iterative optimization unit configured to, form a total loss based on segmentation loss, prediction loss, and physical constraint loss, and optimize network parameters of the decoder and the bi-directional feature correction process through the gradient backpropagation using the total loss function.

An electronic device in the embodiments of this disclosure includes:

a processor, a memory, and an interface for communication with a gateway, where the memory is configured to store a program and data, and the processor calls the program stored in the memory to perform the above method.

A computer-readable storage medium in the embodiments of this disclosure includes a program, which, when executed by a processor, is configured to perform the above method.

The deep learning method, apparatus, device, and medium for the task joint optimization based on the vascular centerline guidance in the embodiments of this disclosure achieve synergistic improvement in both anatomical reconstruction accuracy and hemodynamic prediction through end-to-end joint optimization. The vascular centerline guidance is used to provide gated feature optimization and computational efficiency adjustment for an encoding process. Specific morphological data of the vascular centerline guidance is used to form a control mechanism for modulating efficiency of local feature extraction. The model uses two label types, namely hemodynamic function and vascular morphology, to alleviate a scarcity problem of hemodynamic annotations and enhance generalization ability of the model. Meanwhile, prior knowledge is used to form physical constraints for output results, ensuring rationality of prediction results of blood flow parameters, and improving segmentation accuracy.

BRIEF DESCRIPTION OF THE DRAWINGS

FIG. 1-1 shows a flowchart of an encoding-decoding process formed in a deep learning method for task joint optimization based on vascular centerline guidance, provided in one embodiment of this disclosure.

FIG. 2-1 shows a flowchart of a local image feature formed in a deep learning method for task joint optimization based on vascular centerline guidance, provided in one embodiment of this disclosure.

FIG. 3 shows a structural schematic diagram of a U-Net backbone network used for forming an optimization model in a deep learning method for task joint optimization based on vascular centerline guidance, provided in one embodiment of this disclosure.

DETAILED DESCRIPTION

In order to make objectives, technical solutions, and advantages of this disclosure clearer and more understandable, the following will further explain this disclosure in combination with drawings and specific implementation manners. Obviously, described embodiments are only some embodiments of this disclosure, not all embodiments. Based on the embodiments of this disclosure, all other embodiments obtained by those skilled in the art without creative labor are within a protection scope of this disclosure.

Figure 2:
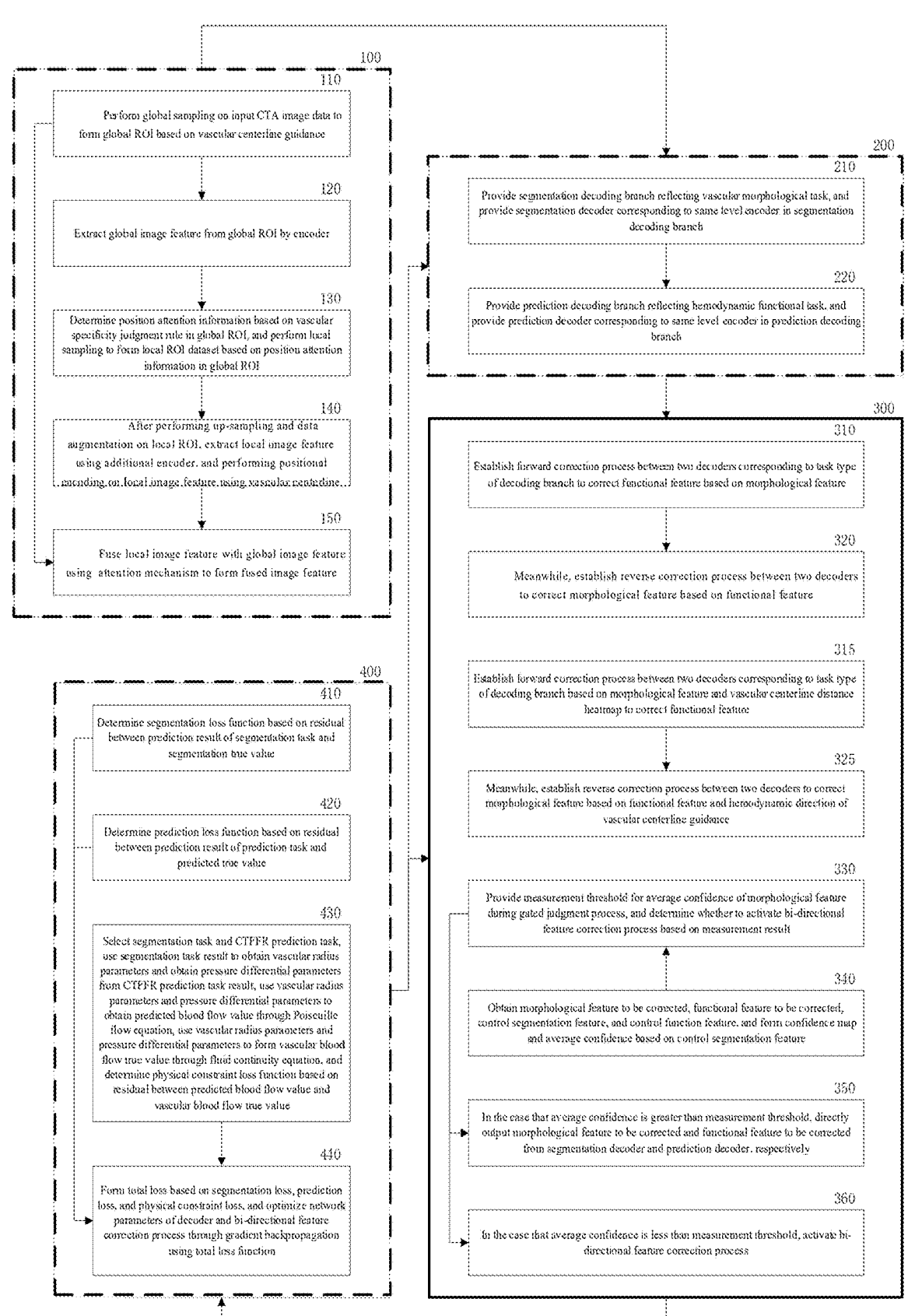
FIG. 2 shows a flowchart of a U-Net backbone network used for multitasking optimization in a deep learning method for task joint optimization based on vascular centerline guidance, provided in one embodiment of this disclosure.
Figures 1, 2:
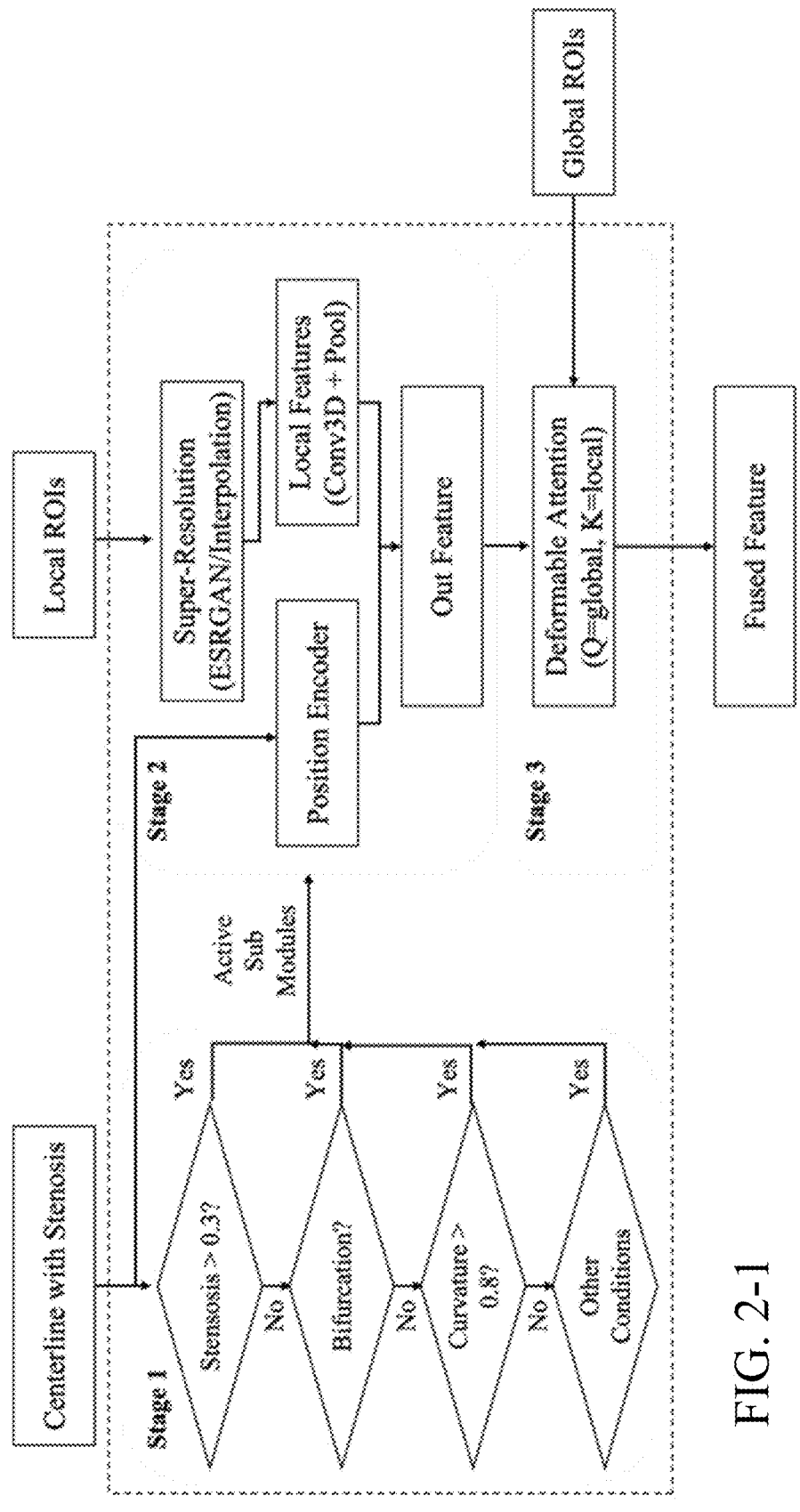
FIG. 1 shows a flowchart of a deep learning method for task joint optimization based on vascular centerline guidance, provided in one embodiment of this disclosure.

A deep learning method for task joint optimization based on vascular centerline guidance in one embodiment of this disclosure is shown in FIG. 1. In FIG. 1, this embodiment includes the following steps.

At step 100, in a process of extracting a global image feature by an encoder, a local image feature is extracted after performing data augmentation on a local image with morphological specificity based on the vascular centerline guidance, and the local image feature is fused with the global image feature to form a fused image feature.

Those skilled in the art may understand that in neural network architectures such as CNN and Transformers, processing solutions adopting an encoder-decoder structure are all included for task types such as classification and segmentation, object detection, prediction and regression, and semantic segmentation. For example, in a U-Net image segmentation model under a CNN architecture, one of U-Net type networks such as Classic U-Net, Swin-UNETR, Attention U-Net, ResU-Net, UNet++ is used as a backbone network. By down-sampling to extract an image feature and expand a receptive field through an encoder and up-sampling to restore spatial resolution and fuse features through a decoder to achieve highly accurate pixel-level image segmentation. In practical applications, an image segmentation model for a same task objective may be replaced with a combination of the encoder and the decoder under an architecture such as Transformers.

Those skilled in the art may understand that prior knowledge may verify correlation and mutual influence between tasks related to vascular morphology and hemodynamic function. For decoding requirements of different tasks, it is necessary to use a targeted encoder for image feature extraction. During an image feature extraction process, the encoder is constructed based on task requirements, which may be uniformly constructed for rich feature types, or separately constructed based on different feature types for hybrid use. Using a hybrid encoder may establish rich kinds of annotations and labels for image features at a same encoding level, which may relieve a scarcity problem of feature annotations caused by limitations of a single encoder.

Those skilled in the art may understand that a vascular centerline, as an organizational form of rich vascular-related information, uses point coordinates to locate a spatial trajectory and form positional encoding with vascular information. Information types carried by the vascular centerline include but are not limited to geometric morphology information of position, orientation, length and curvature, bifurcation and confluence, topological structure information of connectivity and level structure, and hemodynamic information of stenosis position and stenosis degree.

An extraction process of a global image feature and a local image feature is targeted to an input image containing a blood vessel. A medical image including the blood vessel includes but is not limited to 3D CTA, X-ray angiography, magnetic resonance angiography (MRA), vascular ultrasound, and other medical images.

A global ROI image or a local ROI image is obtained from an image containing the blood vessel by providing a ROI region size. The global ROI image is directly subjected to global image feature extraction using the encoder. The local ROI image and vascular information related to a spatial position feature of the local ROI image are obtained under guiding influence of the vascular centerline. A size of a global ROI or a local ROI may be dynamically adjusted based on task characteristics, ensuring dynamic focusing accuracy of the local ROI, and effectively balancing sampling efficiency of a feature signal. For example, the local ROI image of the blood vessel is determined by dynamically adjusting based on the vascular morphology or a specific judgment of the vascular morphology. Rules for the specific judgment include but are not limited to parameter thresholds set for morphological and functional parameters such as local stenosis rate, centerline curvature, and vascular bifurcation. Whether there is specificity in a point position of the vascular centerline is determined based on the rules for the specific judgment, and a specific position of the blood vessel is determined based on the point position and using spatial guidance of the vascular centerline.

For a vascular local ROI image obtained through vascular centerline information, the up-sampling is used to increase resolution, and data augmentation methods such as geometric transformation, brightness contrast adjustment, or noise increase are used to increase sample diversity and resolution accuracy. Then, an additional encoder targeting local vascular microstructure is used to extract the local image feature from the local ROI image, while the positional encoding is performed based on the corresponding point coordinate information of the vascular centerline guidance. Furthermore, an attention mechanism is used to enable cross-modal fusion of local image features with global image features (at the same resolution) output by the encoder, forming a fused image feature output for subsequent processing by the decoder.

At step 100$a$, a bi-directional feature correction process is formed between decoders of different decoding branches.

A decoding branch is formed for tasks oriented to the vascular morphology and vascular and hemodynamic properties, and decoder differences between decoding branches and mutual influence of tasks are used to form bi-directional correction of output features of two decoders. Any pair of decoders in two task types are enabled to mutually improve accuracy of the output features.

The deep learning method for the task joint optimization based on the vascular centerline guidance in the embodiments of this disclosure improves efficiency and accuracy of encoding and decoding by using information guidance of the vascular centerline guidance to construct high-precision annotation data that adapts to multitasking, and forms synergistic optimization of the overall model, alleviating the scarcity problem of annotations for a functional status analysis outside of the vascular morphology, and ensuring the generalization ability of the model. Meanwhile, the correlation between vascular morphology reconstruction and other hemodynamic functional predictions has been achieved, increasing interpretability and rationality of a prediction result.

The deep learning method for the task joint optimization based on the vascular centerline guidance in one embodiment of this disclosure is shown in FIG. 1-1. In FIG. 1-1, step 100$a$ of this embodiment may specifically include the following steps.

At step 200, the decoder is configured based on a task type to decode the fused image feature, and at least one decoding branch is formed for a vascular morphological task and at least one decoding branch is formed for a hemodynamic functional task.

Those skilled in the art may understand that the decoder is configured based on decoding task requirements, and the decoder is used to concatenate, connect, and decode an encoded image feature to form a task decoding branch. Different task combinations are used to improve overall expressive performance of the model. Task types mainly include those targeting the vascular morphology and those targeting the hemodynamic function. Tasks related to the vascular morphology include but are not limited to segmentation and detection of vascular boundaries, and vascular diameters or intima related to the vascular morphology. Tasks related to the hemodynamic function include but are not limited to flow rate, blood pressure, or functional prediction of CTFFR related to the hemodynamic function. Regarding interrelated related prior knowledge between the two task types, during a decoding process, relevant tasks corresponding to a task type are needed to form the decoder, which is used to form related tasks in one task type. Each task type includes at least one related task, and each related task forms one decoding branch. Specifically, there may be a many-to-many or one-to-many relationship between the number of related tasks for the two task types.

In each decoding branch, the decoder is provided and the number of decoders is determined based on task requirements. Usually, in each decoding branch, the type of the decoder meets the decoding task requirements, and the number of decoders corresponds to the number of encoders, all at a same level. In practical applications, different decoder architectures may be adopted, including but not limited to a CNN based decoder, a RNN based decoder, a Transformer based decoder, and the like. For example, for an encoder and decoder backbone network formed by U-Net, the number of decoders in each decoding branch basically corresponds to the number of encoders during an encoding process, and encoder features and decoder features of the same level at different resolutions are concatenated and connected through skip connections, and a task result is output after up-sampling step by step up to an original resolution layer of the input image.

At step 300, in any pair of decoding branches in two task types, the bi-directional feature correction process using an output feature of one decoder to correct an output feature of the other decoder is formed between the decoders of the two task types.

Those skilled in the art may understand that different decoding branches include the decoders corresponding to the task types. The decoders involved in bi-directional feature correction are at the same level in different decoding branches, forming a pair of decoders that may mutually correct each other's feature through the bi-directional feature correction process. The bi-directional feature correction process applies bi-directionally to a pair of decoders of the same level, forming a correction to features received from another decoder based on features received from one decoder, and changing feature outputs of two decoders through feature correction. During the bi-directional feature correction process, feature inputs (related to the vascular morphology or the hemodynamic function) include corrected features, such as the feature outputs (as the corrected features) from the same level decoders. The feature inputs further include control features, such as the feature outputs (the corrected features as the control features) from the same level decoders or the feature output (as the control features) from preceding level decoders, down-sampling feature outputs (as the control features) including final output results of tasks, and the like. The feature inputs may also be combinations of the above several outputs. At least one bi-directional feature correction process is included between a pair of decoding branches targeting the vascular morphology and the hemodynamic function, or each decoding period of the same level may also include a bi-directional feature correction process.

Outputs of the bi-directional feature correction process are corrected feature outputs for the same level decoders after feature correction. The same level decoders use the corrected features to replace original features, and then re-decode them after concatenation and skip connections to form the output features that are fed to a next level.

During the bi-directional feature correction process, using the control features may form an interactive judgment to control a correction process. An interactive judgment mode includes but is not limited to attention mechanism based interaction, gated mechanism based interaction, skip connections based interaction, or adversarial training based interaction. In one embodiment of this disclosure, the bi-directional correction process may form an (interactive) decoder structure.

In one embodiment of this disclosure, in the case that there is more than one decoding branch for each task type, at least one bi-directional feature correction process may be formed between any pair of decoding branches in the two task types.

The deep learning method for the task joint optimization based on the vascular centerline guidance in the embodiments of this disclosure uses hemodynamic functional status that has prior correlation with the vascular morphology to establish a joint analysis means for the vascular morphology, forming joint promotion of the vascular morphology and functional analysis. The efficiency and the accuracy of encoding and decoding are improved by using the information guidance of the vascular centerline guidance to construct the high-precision annotation data that adapts to the multitasking, and the synergistic optimization of the overall model is formed, alleviating the scarcity problem of the annotations for the functional status analysis outside of the vascular morphology, and ensuring the generalization ability of the model. The bi-directional correction process between the decoding branches of multiple task types is constructed to form the synergistic optimization between different status analyses, improving the accuracy of each status analysis.

Figure 3:
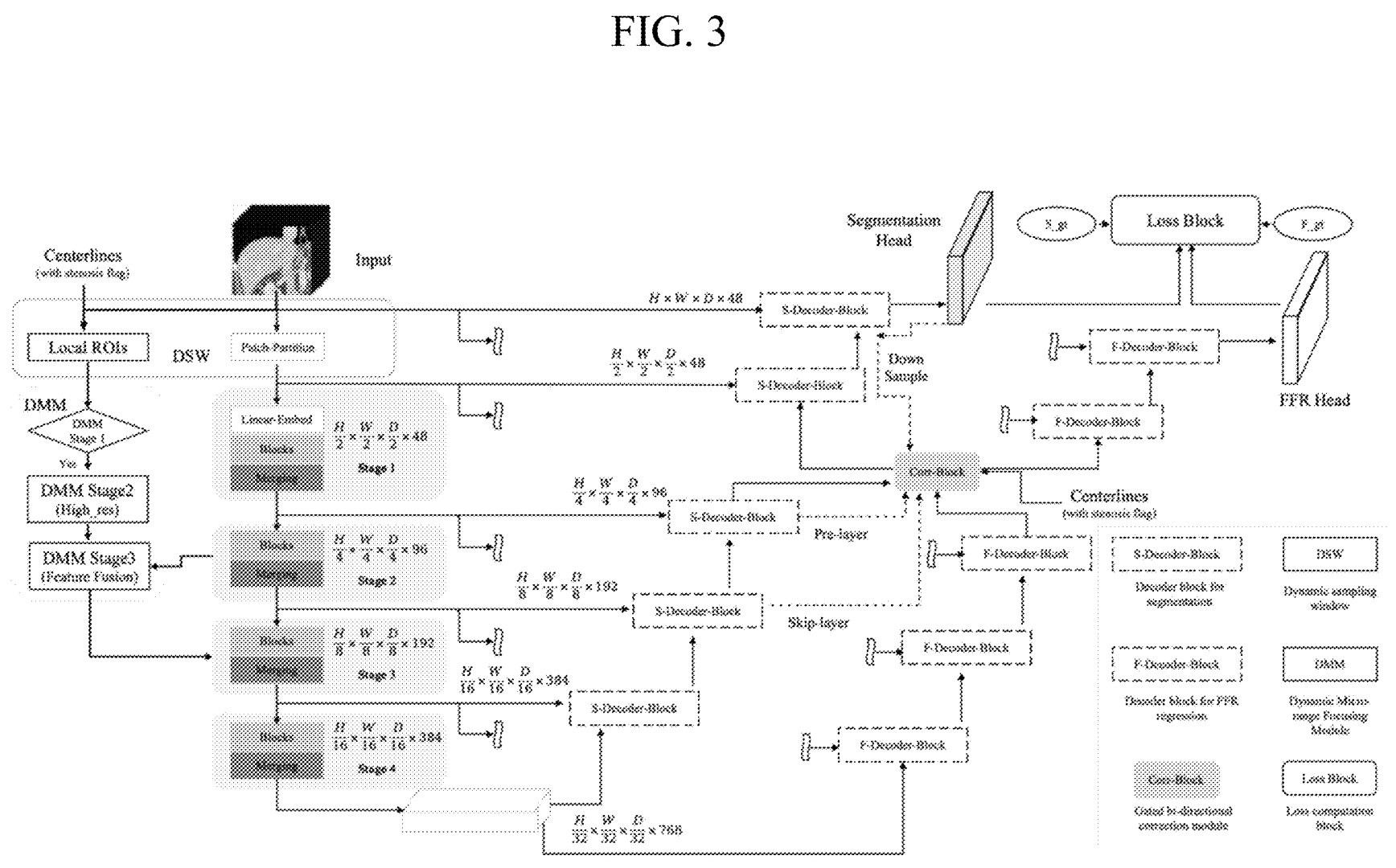

The deep learning method for the task joint optimization based on the vascular centerline guidance in one embodiment of this disclosure uses a U-Net backbone network for the task joint optimization, as shown in FIG. 2. An optimization model structure formed by the deep learning method for the task joint optimization based on the vascular centerline guidance according to one embodiment of this disclosure is shown in FIG. 3. In one embodiment of this disclosure, the deep learning method for the task joint optimization based on the vascular centerline guidance forms the local image feature, as shown in FIG. 2-1. As shown in combination with FIGS. 2, 2-1, and 3, in this embodiment, and based on optimization methods of the above embodiments, a Swin UNetR network is adopted as a backbone network of an encoding and decoding structure, forming parallel, layer by layer up-sampling segmentation decoding branches and prediction decoding branches. In step 100, it includes the following steps.

At step 110, global sampling is performed on an input image containing a blood vessel to form a global ROI based on the vascular centerline guidance.

Information on the point coordinates of the vascular centerline provides pathway positioning for a spatial direction of the blood vessel. Based on the information on the point coordinates, a basic spatial position of the blood vessel in the image containing the blood vessel may be determined, such as distribution of the blood vessel in image coordinate space. The global ROI for the global sampling is formed based on the basic spatial position. The global ROI may be a fixed size slice image formed based on the image containing the blood vessel, or a stitched image such as a straightened view or a probe image formed based on the vascular centerline. The size of the global ROI may be preset based on the image containing the blood vessel or adjusted based on content of the global ROI.

At step 120, the global image feature is extracted from the global ROI by the encoder.

In one embodiment of this disclosure, a swin-transformer encoder is selected as a hybrid encoder that may simultaneously adopt a layered structure and a window-based self-attention mechanism to obtain associated spatial feature representations and semantic information. By using the hybrid encoder, features of the image may be captured at different scales in a step-by-step manner, input medical images are gradually transformed into low resolution spatial feature representations while preserving important semantic information.

In one embodiment of this disclosure, the hybrid encoder performs 4-stage down-sampling on the image containing the blood vessel to obtain four levels of a ½ resolution feature map, a ¼ resolution feature map, a ⅛ resolution feature map, a 1/16 resolution feature map, and a 1/32 feature map at bottleneck.

At step 130, position attention information is determined based on a vascular specificity judgment rule in the global ROI, and local sampling is performed to form a local ROI dataset based on the position attention information in the global ROI.

The vascular specificity judgment rule targets information carried by the vascular centerline that characterizes specific vascular morphology. A set of position attention information for specific local vascular morphology relative to the point coordinates along the vascular centerline may be determined. The local sampling is performed based on the position attention information in the global ROI to form local ROIs for all blood vessels of specific morphology. The local ROI is centered around the point coordinates along the vascular centerline.

At step 140, after performing up-sampling and the data augmentation on the local ROI, the local image feature is extracted using an additional encoder, and positional encoding is performed on the local image feature using a vascular centerline.

In one embodiment of this disclosure, the up-sampling can ensure that the resolution of the local ROI is compatible with the resolution of one feature map formed by the encoder. Sample diversity is enhanced through data augmentation. The positional encoding enables the feature map of the local ROI to acquire spatial position compatibility with the feature map of the global ROI.

At step 150, the local image feature is fused with the global image feature using an attention mechanism to form the fused image feature.

The position and the resolution of the feature map of the local ROI are adapted to fusion requirements. The fused image feature formed by fusing features of self-attention or multi-scale attention based on the positional encoding and resolution determination carries rich features of the specific local vascular morphology.

As shown in FIG. 2-1, in one embodiment of this disclosure, the vascular specificity judgment rule includes but is not limited to a judgment rule such as vascular stenosis rate (threshold) status, vascular bifurcation (switch value) status, and vascular curvature (threshold) status. The judgment rules are targeted to prior laws and professional practices, which may serve as verifiable gold standards during a diagnosis and treatment process, may be gradually updated and optimized, and may form a morphological attention focus related to coordinates. The judgment rules are used to fully schedule processing efficiency and balance processing power. For example, in the prior knowledge, a position where vascular geometric topology undergoes a mutation often causes changes in blood flow parameters. In the case that the blood vessel becomes diseased and the lumen of the blood vessel becomes smaller, the true lumen of the blood vessel is smaller than the lumen of its upstream and downstream blood vessels, and a FFR value sharply drops along the vascular centerline. In the case that the blood vessel bifurcates, the diameter of unaffected daughter blood vessels may be slightly smaller than the diameter of the parent blood vessel. Based on laws of fluid mechanics, the blood flow of the parent blood vessel is equal to the total blood flow of the daughter blood vessels. At this time, pressure values between the parent blood vessel and the daughter blood vessels (CTFFR may be understood as a derived value of a pressure value) are continuously distributed without a sudden decrease, while blood flow values show the sudden decrease. For a position with the large vascular curvature, a complex blood flow pattern may occur locally, resulting in unstable blood pressure and uneven flow velocity. Drastic changes in the blood flow parameters may be used to infer changes in geometric parameters. In the case that the FFR value suddenly decreases, it may be determined that there is the mutation in a local vascular topology structure. In the case that there is no change in the FFR value or the change is not significant but there is an obvious lesion (such as high calcification, artifacts, and the like) in the image, it may be determined that the lesion is mainly an error introduced by a method of visualization, rather than true morphology of the blood vessel.

The deep learning method for joint optimization based on the vascular centerline guidance in the embodiments of this disclosure forms a focusing mechanism that uses a dynamic local ROI of the vascular centerline guidance. Specific features of the vascular morphology reflected by the vascular centerline guidance undergoes the data augmentation while effective identification is achieved, resulting in higher image feature extraction accuracy and richer feature types. Meanwhile, the attention mechanism combined with coordinate encoding is used to form effective fusion of related image features, ensuring synchronous improvement of data annotations of the vascular morphology and the hemodynamic function in terms of type and data volume, and avoiding the scarcity problem of the annotations during a deep learning training process.

In one embodiment of this disclosure, replaced is as follows.

At step 130, the local ROI is adjusted to perform the local sampling to form the local ROI dataset in the global ROI, and the position attention information of the local ROI containing specific vascular morphology is determined based on the vascular specificity judgment rule.

It is possible to perform the global sampling to form the global ROI while also performing the local sampling to form the local ROI based on a fixed or dynamic sampling window size, providing a concurrent adjustment mechanism for an acquisition and encoding process of the global image feature and the local image feature, effectively using computing power resources to control encoding efficiency.

As shown in FIG. 3, in one embodiment of this disclosure, the up-sampling and the data augmentation in step 140 are set based on a resolution level of the fusion of the local image feature and the global image feature. This enables feature fusion to be implemented at any encoding level based on requirements for the self-attention mechanism, ensuring flexibility of adapting local sampling data volume to feature fusion level.

As shown in FIG. 2-1, in one embodiment of this disclosure, the additional encoder adopts cascaded 3D convolution to extract the local feature and fuse it with positional encoding of a vascular centerline point to obtain the local image feature. In the case that a high-precision local sampling signal is used to obtain a more abstract and advanced image feature, position information of the vascular centerline point is integrated into the image feature, so that the local image feature and the global image feature obtain a spatial basis of the attention mechanism.

As shown in FIG. 2-1, in one embodiment of this disclosure, the up-sampling is performed using interpolation or an ultra-precision network such as ESRGAN to obtain a high-resolution local image, which is beneficial for extracting a morphological feature (such as a patch, a pipe wall, and other detail features) of a small window at the high resolution.

The vascular centerline includes stenosis information, usually obtained by one of the following methods:

in the case that the centerline is known, obtain a cross-sectional diameter adopting cross-sectional 2D-Unet segmentation, and calculate stenosis degree along the centerline, and in the case that the centerline is unknown, segment an entire image and extract coordinates of the centerline adopting lightweight 3D-Unet, and calculate vascular stenosis along the centerline. Based on complexity of directly using centerline space guide information, a targeted stenosis information extraction process is formed to improve identification efficiency and accuracy of the blood vessel.

The deep learning method for the task joint optimization based on the vascular centerline guidance in the embodiments of this disclosure uses the vascular centerline guidance information to provide gated feature optimization and computational efficiency adjustment for the encoding process. Specific morphological data of the vascular centerline guidance is used to form a control mechanism for modulating efficiency of local feature extraction. The effective fusion of a local high-precision up-sampling feature and a global image feature is formed using coordinate space guidance of the vascular centerline, so that the accuracy of an image features at a key position during the encoding process is improved, ensuring that a more accurate detail feature may be obtained during the decoding process. The local image feature of the vascular centerline guidance not only improves spatial feature accuracy of the vascular morphology but also synchronously improves semantic feature accuracy of the related hemodynamic function, alleviating the scarcity problem of the annotations of hemodynamic status outside of the vascular morphology, and ensuring the generalization ability of the model.

As shown in combination with FIGS. 2 and 3, in this embodiment, and based on the optimization methods of the above embodiments, step 200 includes the following steps.

At step 210, a segmentation decoding branch reflecting the vascular morphological task is provided, and a segmentation decoder corresponding to a same level encoder is provided in the segmentation decoding branch.

Morphological parameters corresponding to the vascular morphological task include but are not limited to contour, inner diameter, inner wall mask, topological shape, and the like.

Segmentation decoders or decoder units (S-Decoder Block) at each level in the segmentation decoding branch perform the skip connections between decoding outputs of previous level decoders and encoding results of the same level before decoding and feeding them to the next level, up-sampling step by step up to the original resolution layer of the input image.

Specifically, the segmentation decoding branch performs deconvolution and normalized up-sampling through the segmentation decoder, combines the output features of the same level encoders with the same resolution to perform the skip connections on decoding, and finally appends 1×1×1 convolution to features of an original resolution layer and uses a sigmoid activation function to generate a segmentation probability map.

At step 220, a prediction decoding branch reflecting the hemodynamic functional task is provided, and a prediction decoder corresponding to a same level encoder in the prediction decoding branch is provided.

Functional parameters corresponding to the hemodynamic functional task include but are not limited to blood pressure parameters, blood flow parameters, CTFFR, and the like.

Prediction decoders or decoder units (F-Decoder Block) at each level in the segmentation decoding branch perform the concatenation and the skip connections between decoding outputs of previous level decoders and encoding results of the same level before decoding and feeding them to the next level, up-sampling step by step up to the original resolution layer of the input image.

Specifically, the prediction up-sampling branch performs the deconvolution and the normalized up-sampling through the prediction decoder, combines the output features of the same level encoders with the same resolution to perform the skip connections on the decoding, and finally implements parameter prediction by either appending 1×1×1 convolution or using a fully connected layer to the features of the original resolution layer feature.

In one embodiment of this disclosure, there are at least two task types of decoding branches, one corresponding to the segmentation task of the vascular morphology and the other corresponding to the prediction task of the hemodynamic function. Two tasks may include one segmentation decoding branch and several prediction decoding branches, several segmentation decoding branches and one prediction decoding branch, or several segmentation decoding branches and several prediction decoding branches. Based on the task requirements, a multi task joint optimization training mode for the vascular morphology and the hemodynamic function may be formed.

The deep learning method for the task joint optimization based on the vascular centerline guidance in the embodiments of this disclosure achieves the correlation between the vascular morphology reconstruction and other functional status parameter prediction through multiple decoding branches, forming complementary information between the vascular morphology and the hemodynamic function, and increasing the interpretability and the rationality of the prediction result. A pair of related tasks may be established based on the prior knowledge between any vascular morphological task and any hemodynamic functional task, such as a matching scenario between a coronary artery morphological task and a CTFFR functional task, and the like.

As shown in combination with FIGS. 2 and 3, in one embodiment of this disclosure, and based on the optimization methods of the above embodiments, step 300 includes the following steps.

At step 310, a forward correction process is established between two decoders corresponding to the task type of the decoding branch to correct a functional feature based on a morphological feature.

There are two task types of decoding branches: one is the prediction decoding branch, and the other is the segmentation decoding branch. During the forward correction process, the morphological feature (i.e., to be corrected) is received from the segmentation decoder and the functional feature (i.e., to be corrected) is received from the prediction decoder, a spatial attention weight is generated based on a segmentation confidence map of the morphological features, and a functional feature map is dynamically modulated to obtain a corrected functional feature. Prediction accuracy of the functional feature is improved. The corrected functional feature is output and fed back to the prediction decoder to replace an original functional feature, and then is skip connected with a same level encoder output and decoded and output in the prediction decoder. Subsequently, a subsequent up-sampling and step-by-step decoding process is performed.

At step 320, meanwhile, a reverse correction process is established between the two decoders to correct the morphological feature based on the functional feature.

During the reverse correction process, for the received morphological feature (i.e., to be corrected) and functional feature (i.e., to be corrected), the morphological feature is corrected based on changes in the functional feature (such as in a gradient direction) to obtain a corrected morphological feature. Segmentation boundary accuracy of the morphological feature is improved. The corrected morphological feature is output and fed back to the segmentation decoder to replace an original morphological feature, and then is skip connected with the same level encoder output and decoded and output in the segmentation decoder. Subsequently, the subsequent up-sampling and step-by-step decoding process is performed.

The deep learning method for the task joint optimization based on the vascular centerline guidance in the embodiments of this disclosure uses physical functional status that has prior correlation with the vascular morphology, and uses a fused image feature containing a local high-precision vascular specific morphological feature to train and form mutual promotion and synergistic optimization between a vascular morphological analysis and a hemodynamic functional status analysis. Technical problems of low model generalization ability caused by missing annotation type data, and lack of the task joint optimization in accurately expressing physical feature consistency are overcome.

As shown in combination with FIGS. 2 and 3, in one embodiment of this disclosure, and based on the optimization methods of the above embodiments, step 300 includes the following steps.

At step 315, a forward correction process between the two decoders corresponding to the task type of the decoding branch is established based on the morphological feature and a vascular centerline distance heatmap to correct the functional feature.

A spatial attention weight is generated based on a segmentation confidence map of the morphological feature, and a functional feature map is dynamically modulated to obtain a corrected functional feature. Combining the vascular distance heatmap with the morphological feature to calculate vascular segmentation confidence may reduce computational complexity and improve segmentation focus accuracy around the blood vessel.

At step 325, meanwhile, a reverse correction process between the two decoders to correct the morphological feature is established based on the functional feature and a hemodynamic direction of the vascular centerline guidance.

The morphological feature is corrected based on changes in the functional feature (such as in a gradient direction) to obtain a corrected morphological feature. In physical reality, guidance information of the vascular centerline targeting the hemodynamic direction combined with decrease in the FFR value along the hemodynamic direction may reflect presence of the lesion. Therefore, using centerline guidance direction information to calculate a functional gradient along the hemodynamic direction may capture true changes in the vascular morphology.

The deep learning method for the task joint optimization based on the vascular centerline guidance in the embodiments of this disclosure uses distance guidance and flow direction guidance of the vascular centerline to enhance the mutual promotion and the synergistic optimization of the vascular morphological analysis and the hemodynamic functional status analysis.

Figure 4:
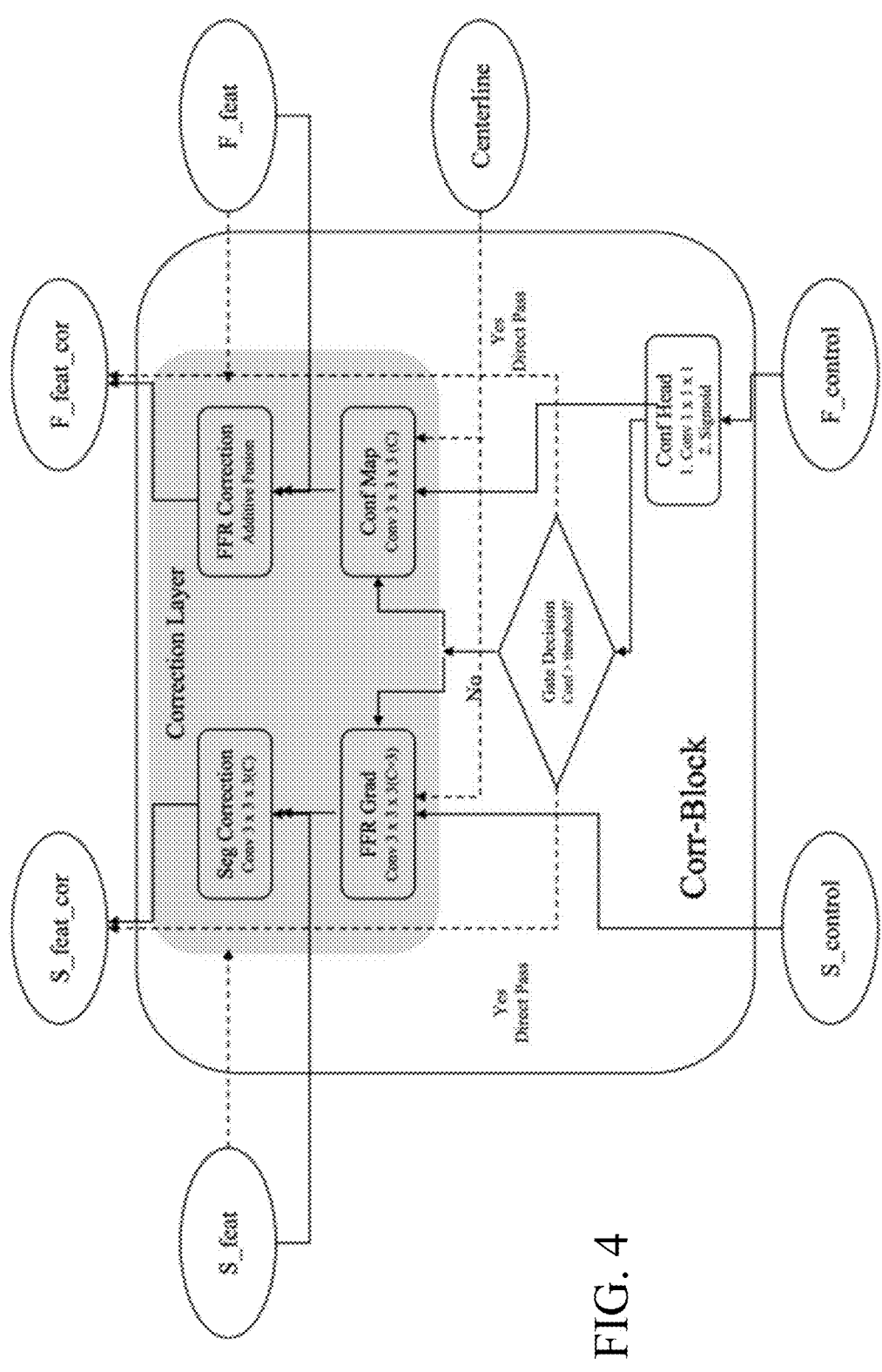
FIG. 4 shows a structural schematic diagram of a gated bi-directional correction module in an optimization model formed by a deep learning method for task joint optimization based on vascular centerline guidance, provided in one embodiment of this disclosure.

As shown in FIG. 4, in one embodiment of this disclosure, in a deep learning method for task joint optimization based on vascular centerline guidance, a U-Net backbone network is used to form a gated bi-directional feature correction module in an optimization model. As shown in combination with FIGS. 2 and 4, in one embodiment of this disclosure, step 300 includes the following steps.

At step 330, a measurement threshold for average confidence of the morphological feature during a gated judgment process (Gate Decision) is provided, and whether to activate the bi-directional feature correction process (Correction Layer) is determined based on a measurement result.

The gated judgment process (Gate Decision) is used to judge a transmission direction of the morphological feature to be corrected (S_feat) and the functional feature to be corrected (F_feat) (usually at the previous level) based on the confidence of the morphological feature output by the segmentation decoder (usually at the previous level). Using the measurement threshold for the average confidence during the gated judgment process as an activation signal for switching the bi-directional feature correction process.

As shown in combination with FIGS. 2 and 4, in one embodiment of this disclosure, based on the above embodiments, judging whether the bi-directional feature correction process is activated includes the following steps.

At step 340, a morphological feature to be corrected (S_feat), a functional feature to be corrected (F_feat), a control segmentation feature (S_control), and a control function feature (F_control) are obtained, and a confidence map and the average confidence are formed based on the control function feature.

As shown in FIG. 4, in one embodiment of this disclosure, a confidence task head (Conf Head) is used to perform the $1\times1\times1$ convolution on the control function feature (F_control) and combined with a Sigmoid activation function operation to obtain the confidence map and the average confidence (conf) of the previous level morphological feature.

At step 350, in the case that the average confidence is greater than the measurement threshold, the morphological feature to be corrected (S_feat) and the functional feature to be corrected (F_feat) are directly output from the segmentation decoder and the prediction decoder, respectively.

In the case that the average confidence is greater than the measurement threshold, the gated judgment process does not activate the bi-directional feature correction process, and directly outputs the morphological feature and the functional feature from a morphological decoder and a functional decoder.

At step 360, in the case that the average confidence is less than the measurement threshold, the bi-directional feature correction process is activated.

As shown in FIG. 4, in one embodiment of this disclosure, the bi-directional feature correction process includes:

outputting a confidence map (Conf Map) of a determined channel and the vascular centerline distance heatmap or performing $3\times3\times3$ convolution on the control function feature (F_control) (formed by the segmentation feature) based on the confidence map (Conf Map) and the vascular centerline distance heatmap to form functional correction data;

outputting a functional gradient (FFR Grad) of a same channel and overlaying with the hemodynamic direction of the vascular centerline guidance or performing the 3×3×3 convolution on a control separation feature (S_control) (formed by the functional feature) based on the functional gradient (FFR Grad) and the hemodynamic direction of the vascular centerline guidance to form morphological correction data;

correcting the morphological feature to be corrected (S_feat) based on the morphological correction data to form a corrected morphological feature (S_feat_cor); and correcting the functional feature to be corrected (F_feat) based on the functional correction data to form a corrected functional feature (F_feat_cor).

Subsequent steps are in the original decoder, where a corrected feature is concatenated and skip connected with the same level encoder output, and then decoded and output in the decoder. In a corresponding up-sampling branch, convolution and normalization are used to up-sample until the original resolution layer is reached. Different task heads are connected to output a final result.

In one embodiment of this disclosure, an input of the bi-directional feature correction process is a previous layer decoding feature, and an output is a feature that needs to be read in, skip connected, and concatenated for this layer of network. An input end uses a previous layer morphological feature or a preceding layer morphological feature as the control function feature to calculate the segmentation confidence, and uses a previous layer functional feature as a control morphology feature to calculate the functional gradient, achieving the correction of the input segmentation feature (the morphological feature to be corrected) and functional feature (the functional feature to be corrected). In practical use, the corrected feature in the bi-directional feature correction process comes from a previous layer decoder. The control feature is not limited to using an output feature of the previous layer decoder, but may be an output feature of a decoder in one of preceding layers, a down-sampling feature of a final prediction head output result, or a combination of several methods. The outputs of the bi-directional feature correction process may be the corrected morphological feature (s_feat_cor) and the corrected functional feature (F_feat_cor), or may be a decoding result after concatenating and skip connecting a feature.

In one embodiment of this disclosure, inputs of two control features in the bi-directional feature correction process may also come from different levels or may be combinations in different ways.

In one embodiment of this disclosure, the corrected feature in the bi-directional feature correction process comes from the previous layer decoder, and the control feature of the bi-directional feature correction process may be the same as the corrected feature.

The deep learning method for the task joint optimization based on the vascular centerline guidance in the embodiments of this disclosure not only achieves the mutual promotion and the synergistic optimization between vascular morphologic analysis accuracy and hemodynamic functional analysis accuracy, but also forms a gated mechanism to flexibly configure correction level and timing of the bi-directional feature correction process between the two decoders corresponding to the task type of the decoding branch. In the case that the segmentation confidence is low, the bi-directional feature correction process is activated, otherwise the original feature is used for fast calculation. In such a case, computational efficiency and computational accuracy of the model may be balanced.

In one embodiment of this disclosure, the bi-directional feature correction process may be provided between decoders of the same level corresponding to the task type of the decoding branch, and activation timing of the bi-directional feature correction process may be adjusted through a gated switch.

As shown in FIG. 3, in one embodiment of this disclosure, the optimization model formed based on the above deep learning method, with the U-Net network as the backbone network, includes one encoding branch and two decoding branches, in which the encoding branch includes:

a dynamic sampling window DSW configured to, acquire the global ROI image and the local ROI image;

a dynamic micro-range focusing module DMM configured to, perform the up-sampling and the data augmentation on the local ROI image, and using the additional encoder for local image feature extraction;

an input layer (Input) configured to, form the normalization and the data augmentation of the input image;

a window partition layer (Patch-Partition) configured to, perform window partitioning and positional encoding on the input image;

an explicit embedding layer (Linear-Embedded) configured to, linearly transform a partitioned image block to form a feature map of determined feature representations and/or feature vectors;

an encoder module (Blocks) configured to, gradually reduce a size of the feature map, increase an abstract degree of the feature, and extract feature information at different scales, where in this embodiment, the encoder module adopts a swin-transformer encoder;

a merging module (Merging) configured to, reduce the size of the feature map while increasing the number of channels during a down-sampling operation, in order to extract higher-level semantic information;

a bottleneck feature (Bottleneck-Features) configured to, preserve the feature map output by a last layer encoder module during the encoding process.

In one decoding branch, it includes:

a segmentation task head (Segmentation-Head) configured to, restore the spatial resolution of the feature map and fuse feature information from different levels in the encoder to form a final segmentation result of the vascular morphology; and a segmentation decoder (S-Decoder-Block) configured to, perform up-sampling, feature concatenation, and convolution processing to gradually restore the size of the feature map.

In another decoding branch, it includes:

a prediction task head (CTFFR-Head) configured to, restore the semantic information of the feature map, and form a final prediction result of a CTFFR value; and a prediction decoder (F-Decoder-Block) configured to, convert a feature extracted by the encoder into a predicted value of CTFFR.

Between two decoding branches, it includes:

two bi-directional feature correction decoders (Corr Block) configured to, be provided between two decoders at the same level, bi-directionally act on two decoders, form the correction to the feature received from the other decoder based on the feature received from one decoder, and change the feature outputs of two decoders through the feature correction.

Between the segmentation task head (Segmentation-Head) and the prediction task head (CTFFR-Head), it includes:

a loss calculation module (Loss-Block) configured to, calculate target loss of prediction results of the segmentation task head and the prediction task head based on a segmentation true value S_gt and a CTFFR true value F_gt.

As shown in FIG. 4, in one embodiment of this disclosure, a gated bi-directional correction module as a bi-directional feature correction decoder in an optimization model for vascular segmentation formed based on the above optimization methods includes:

a confidence head (Conf-head) configured to, calculate the average confidence using convolution (conv) and sigmoid function;

a gated module (Gate-Decision) configured to, determine the average confidence (conf) based on the measurement threshold (threshold), and form interactive control on whether to activate the bi-directional correction process; and a correction layer (Correction-layer) configured to, form the bi-directional correction process.

As shown in FIG. 4, in one embodiment of this disclosure, the correction layer (Correction-layer) includes:

a CTFFR gradient calculation module (FFR-Grad) configured to, calculate a CTFFR gradient direction;

a segmentation feature correction module (Seg-correction) configured to, correct the segmentation feature through the convolution (conv) based on the CTFFR gradient direction;

a confidence map calculation module (Conf-Map) configured to, calculate the confidence map; and a prediction feature correction module (FFR-Correction) configured to, correct a predicted FFR value through additive-fusion based on a confidence weight.

Figure 5:
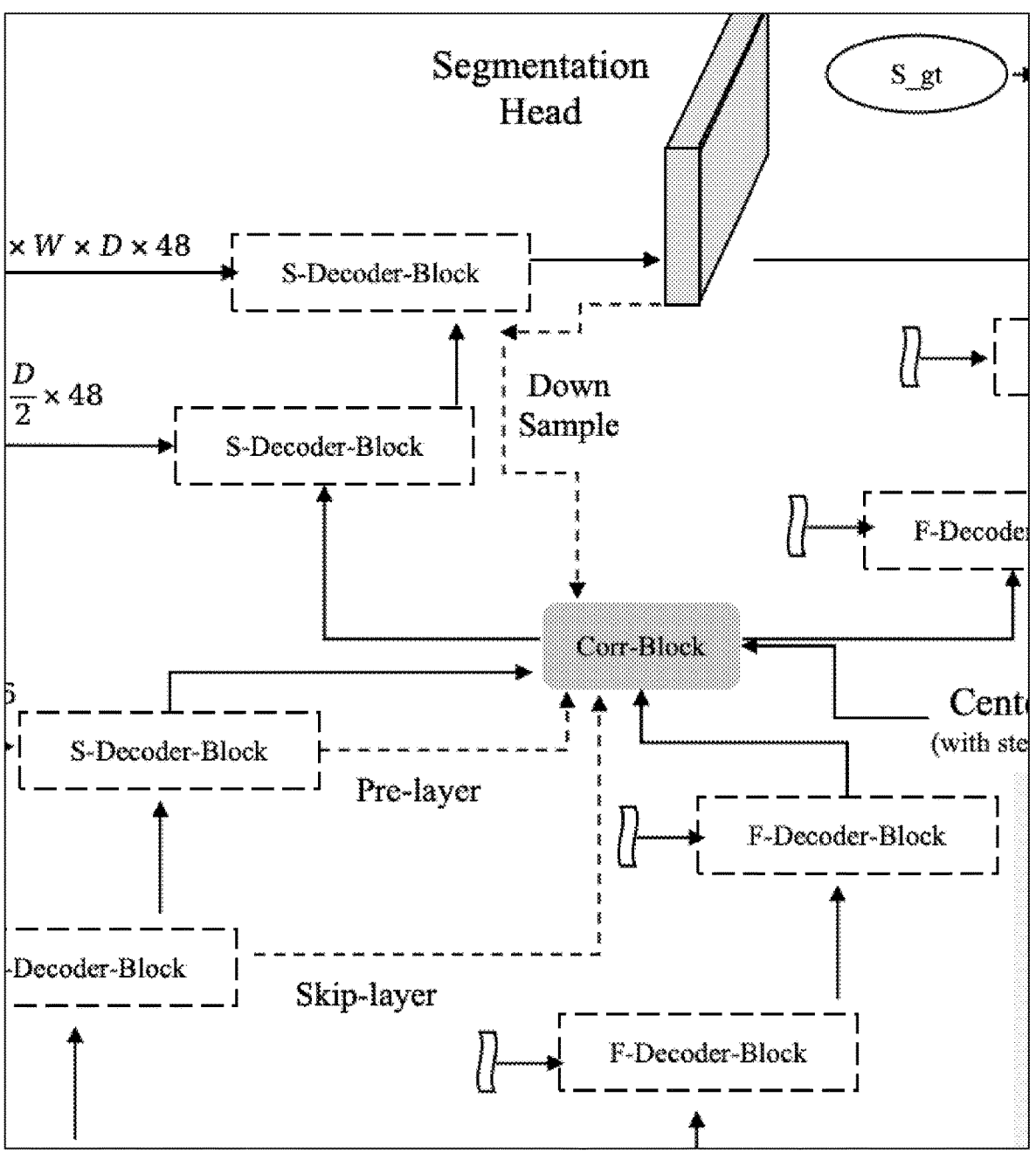
FIG. 5 shows a partial schematic diagram of a feature acquisition pathway of a bi-directional feature correction process in an optimization model formed by a deep learning method for task joint optimization based on vascular centerline guidance, provided in one embodiment of this disclosure.

A feature acquisition pathway in the bi-directional feature correction process in the deep learning method for the task joint optimization based on the vascular centerline guidance in one embodiment of this disclosure is shown in FIG. 5. In FIG. 5, sources of input features for the bi-directional feature correction process are diverse. The input end uses a previous layer segmentation feature (which may be understood as the control function feature) to calculate the segmentation confidence, and uses a previous layer CTFFR feature (which may be understood as the control segmentation feature) to calculate a CTFFR gradient, achieving the correction of the input segmentation feature (the corrected feature) and the CTFFR feature (the corrected feature). In practical use, the corrected feature in the bi-directional feature correction process comes from the previous layer decoder, and the control feature is not limited to using the previous layer decoding feature, but may be a feature of one of the preceding layers, a down-sampling or interpolation feature of a final prediction head output result, or a combination of several methods. An output of the bi-directional correction module may be a corrected feature output or a result of concatenating and skip connecting the feature. Moreover, the inputs of two control features in the bi-directional correction process may also come from different layers or may be the combinations in different ways.

In FIG. 5, dashed portions are possible function control features that may be selected, including:

a) Skip-layer, where a decoding feature obtained from the previous preceding layer is obtained from a larger receptive field and lower resolution; a high-level semantic feature (such as overall vascular morphology) is suitable for global correction with low computational complexity; and a current calculation feature result is known, which does not affect a network calculation order;

b) Pre-layer, where a decoding feature obtained from the previous layer has consistent feature resolution and does not require interpolation, up-sampling, down-sampling, or other calculations; computational efficiency is high, and the model is simple; and the current calculation feature result is known, which does not affect the network calculation order.

c) Down-sample, where a confidence feature obtained through down-sampling from an output result is closer to the output result, may provide low-level details and enhance a correction effect without information loss; however, a prediction result of a current layer is unknown, so two correction modules can only take turns to correct, and the model needs to be trained step by step, making model design more complex.

In the case that pre-layer is selected as a connection method and the control feature comes from the previous layer, a feature to be corrected is used as the control feature at the same time (i.e., S_control=S_feat).

As shown in combination with FIGS. 4 and 5, the gated mechanism formed by the gated module is also an optional module, which may balance the computational efficiency and its corresponding model effect. In the case that the computational efficiency is not considered, the gated module may be discarded to correct features of all input correction modules.

Figure 6:
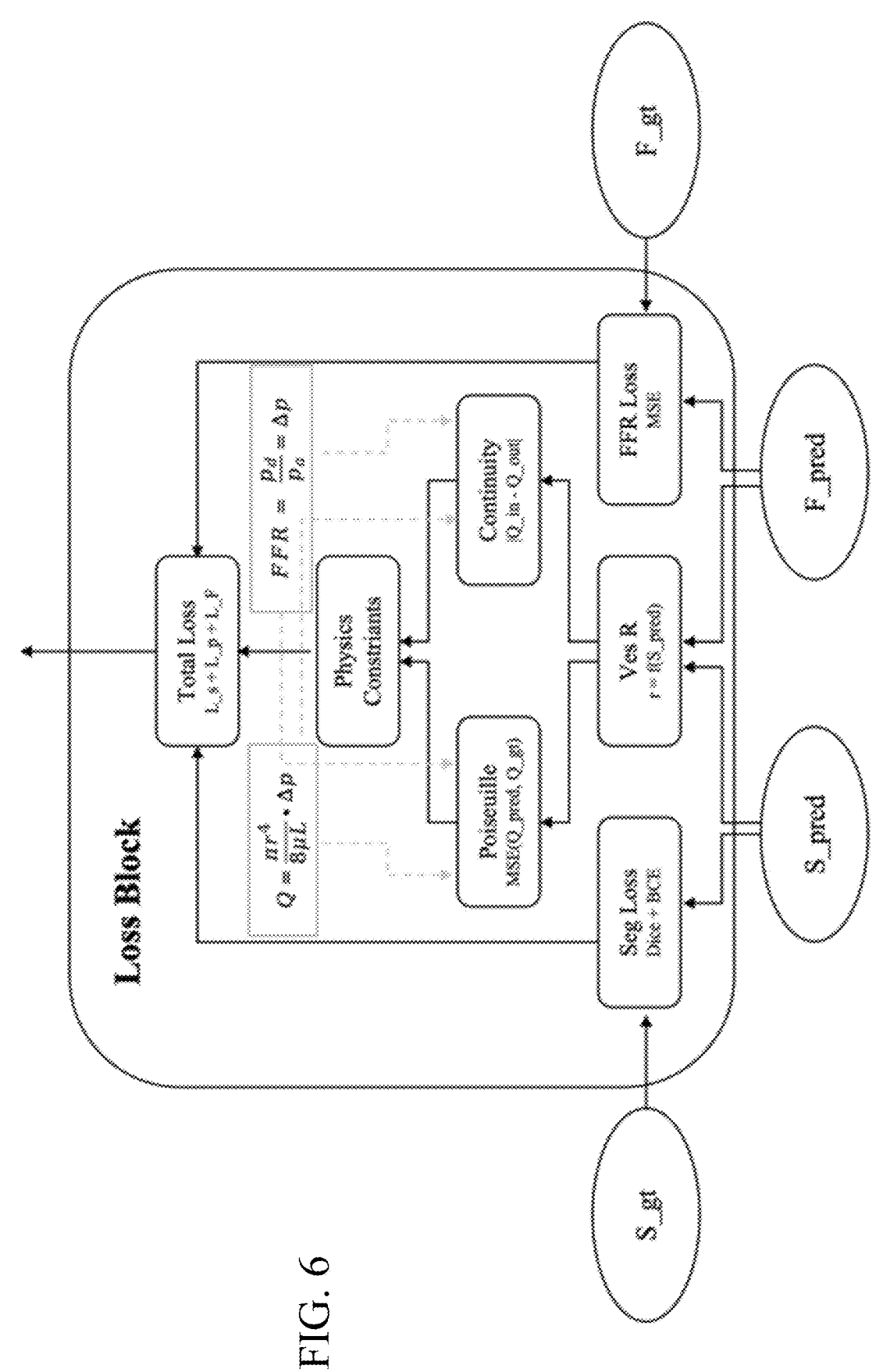
FIG. 6 shows an architectural schematic diagram of a loss function in an optimization model formed by a deep learning method for task joint optimization based on vascular centerline guidance, provided in one embodiment of this disclosure.

As shown in FIG. 6, in one embodiment of this disclosure, in a deep learning method for task joint optimization based on vascular centerline guidance, a U-Net backbone network is used to form a loss function in an optimization model. As shown in combination with FIGS. 1-1 and 6, this embodiment further includes the following steps.

At step 400, vascular morphological parameters and hemodynamic functional parameters obtained from the decoding branches of the two task types are used as independent variables of physical constraint conditions, a physical constraint loss function is determined as a component of a total loss function based on a residual between a predicted value of a dependent variable and a true value of the dependent variable under the physical constraint conditions, and the decoder and the bi-directional feature correction process are optimized through gradient backpropagation of the total loss function.

Those skilled in the art may understand that a segmentation result is formed by segmenting a task head, and a prediction result is formed by predicting a task head. The segmentation result and the prediction result are targeted to corresponding vascular morphological parameters and hemodynamic functional parameters. By determining specific physical constraint conditions (physical equations) with the vascular morphological parameters and the hemodynamic functional parameters as independent variables, predicted values of dependent variable parameters may be obtained based on predicted values formed by the vascular morphological parameters and the hemodynamic functional parameters. A physical constraint loss function is determined by a residual between the predicted values of the dependent variable parameters and true values of the dependent variable parameters obtained through quantitative calculations. The physical constraint loss function is used as a part of the total loss function of the model, and backpropagation is performed based on the total loss function to iterate network parameters to optimize model accuracy. The specific physical constraint conditions include but are not limited to governing equations of Poiseuille flow in fluid mechanics, continuity equations of incompressible fluids, momentum equations, and the like. The specific physical constraints may be global or local. For example, the blood flow in all blood vessels is required to satisfy the Poiseuille flow related to the diameter of a segmented blood vessel. The blood vessel at the bifurcation should satisfy the continuity equations, that is, the total amount of the blood flow flowing into each branch should be equal to the blood flow of the parent blood vessels. Physical constraint methods and formulas used are optional, and other similar physical equations that may achieve constraints between geometric information and functional parameter information may be used depending on the situation.

The deep learning method for the task joint optimization based on the vascular centerline guidance in the embodiments of this disclosure achieves an optimization effect of the model by adding loss of composite physical conditions. By using parameter equations that conform to physical laws of fluid mechanics to constrain the functional parameters predicted by the model, and calculating residuals of the predicted values brought into the equations, prediction results are more in line with the physical laws, improving the rationality of hemodynamic functional prediction. The physical constraints indirectly act on a morphological channel such as vascular segmentation through a bi-directional interactive correction structure designed in the model, synchronously improving the accuracy of the segmentation result.

As shown in combination with FIGS. 2 and 6, in one embodiment of this disclosure, a segmentation task and a CTFFR prediction task of the model are selected, step 400 includes the following steps.

At step 410, a segmentation loss function is determined based on a residual between a predicted result of a segmentation task and a segmentation true value.

Specifically, based on a residual between a segmentation prediction result S_pred and a segmentation true value S_gt of the segmentation task, segmentation loss Seg_loss is determined. A segmentation loss function L_s adopts a Dice (Dice Coefficient) loss function in combination with a BCE (Binary Cross Entropy) loss function.

At step 420, a prediction loss function is determined based on a residual between a prediction result of a prediction task and a predicted true value.

Specifically, based on a residual between a prediction result F_pred and a predicted CTFFR true value F_gt, CTFFR loss (FFR Loss) is determined, and a CTFFR loss function L_F adopts a mean squared error (MSE) loss function.

At step 430, a segmentation task and a CTFFR prediction task are selected, a segmentation task result is used to obtain vascular radius parameters and obtain pressure differential parameters from a CTFFR prediction task result, the vascular radius parameters and the pressure differential parameters are used to obtain a predicted blood flow value through a Poiseuille flow equation, the vascular radius parameters and the pressure differential parameters are used to form a vascular blood flow true value through a fluid continuity equation, and the physical constraint loss function is determined based on a residual between the predicted blood flow value and the vascular blood flow true value.

Specifically, a predicted value Ves-R of a vascular radius is calculated based on the segmentation map of the segmentation task, and a pressure difference FFR between distal vascular pressure and coronary artery pressure is calculated based on a predicted pressure value of a CTFFR prediction task. A predicted value Q of the blood flow is obtained by bringing the pressure difference and the vascular radius formed by the predicted value into a Poiseuille flow formula. Meanwhile, physical constraints (phisics-constraints) are established and physical constraint loss is determined based on a residual between a predicted value and a true value of the blood flow as judged by physical law constraints of a fluid continuity equation ($|Q_{-in}-Q_{-out}|$) on vascular inflow $Q_{-in}$ and vascular outflow $Q_{-out}$. A physical constraint loss function L_p adopts the mean squared error (MSE) loss function.

At step 440, a total loss is formed based on segmentation loss, prediction loss, and physical constraint loss, and network parameters of the decoder and the bi-directional feature correction process are optimized through the gradient backpropagation using the total loss function.

$$\text{Total loss function} = \text{Segmentation loss function } L\_s + \text{CTFFR loss function}$$

$$L\_F + \text{Physical constraint loss function } L\_p.$$

The network parameters of the decoder and the bi-directional feature correction process are iterated and optimized by means of the total loss function until accuracy requirements of the model are met.

Figure 7:
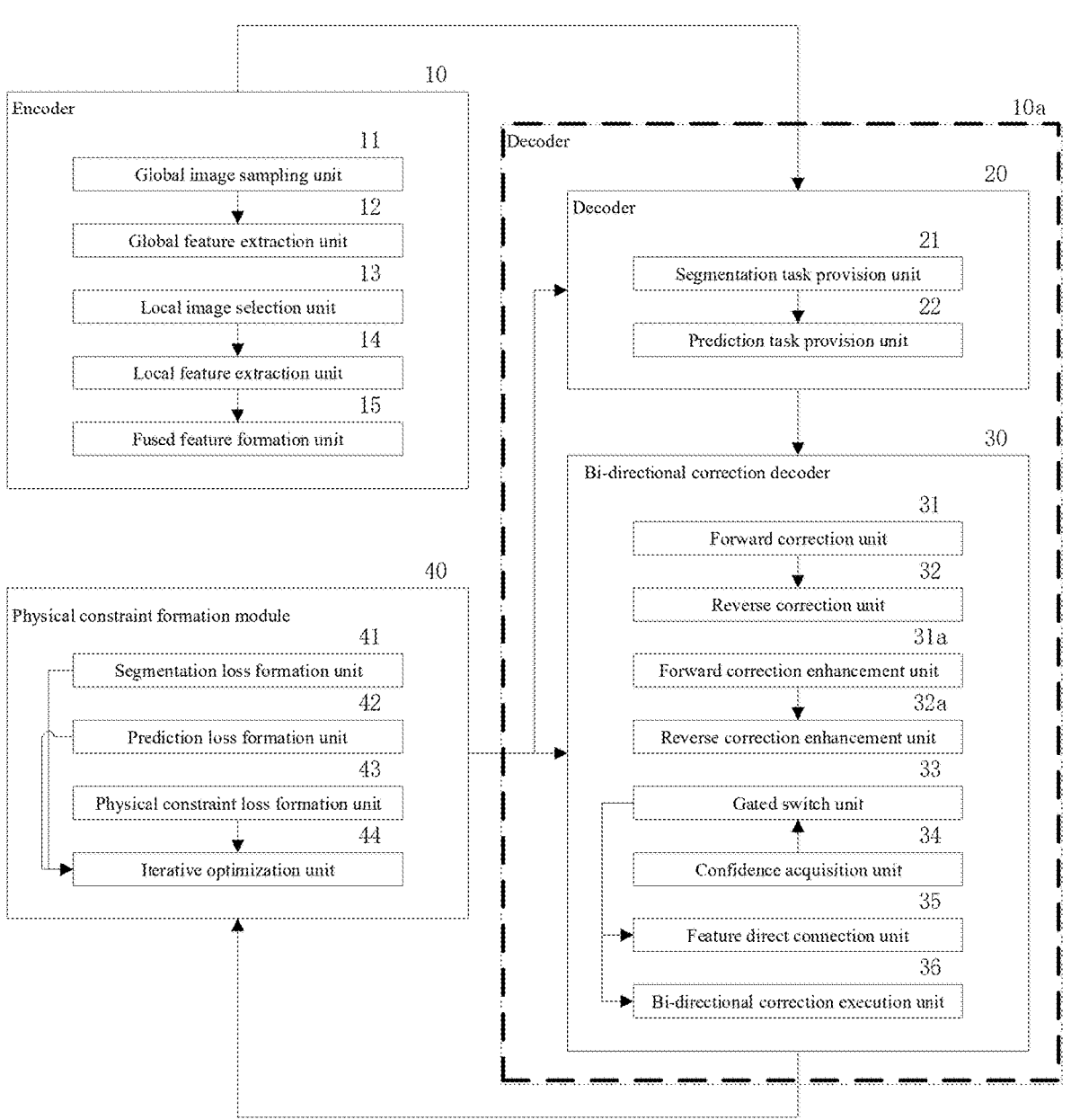
FIG. 7 shows an architectural schematic diagram of a deep learning apparatus for task joint optimization based on vascular centerline guidance, provided in one embodiment of this disclosure.

A deep learning apparatus for task joint optimization based on vascular centerline guidance in one embodiment of this disclosure is shown in FIG. 7. In FIG. 7, this embodiment includes:

an encoder 10 configured to, in a process of extracting a global image feature by an encoder, extract a local image feature after performing data augmentation on a local image with morphological specificity based on the vascular centerline guidance, and fuse the local image feature with the global image feature to form a fused image feature; and a decoder correction module 10*a* configured to, form a bi-directional feature correction process between decoders of different decoding branches.

As shown in FIG. 7, in one embodiment of this disclosure, the decoder correction module 10*a* includes a decoder 20 configured to, configure a decoder based on a task type to decode the fused image feature, and form at least one decoding branch for a vascular morphological task and at least one decoding branch for a hemodynamic functional task; and a bi-directional correction decoder 30 configured to, in any pair of decoding branches in two task types, form the bi-directional feature correction process using an output feature of one decoder to correct an output feature of the other decoder between the decoders of the two task types.

As shown in FIG. 7, in one embodiment of this disclosure, the encoder 10 includes:

a global image sampling unit 11 configured to, perform global sampling on an input image containing a blood vessel to form a global ROI based on the vascular centerline guidance;

a global feature extraction unit 12 configured to, extract the global image feature from the global ROI by the encoder;

a local image selection unit 13 configured to, determine position attention information based on a vascular specificity judgment rule in the global ROI, and perform local sampling to form a local ROI dataset based on the position attention information in the global ROI;

a local feature extraction unit 14 configured to, after performing up-sampling and the data augmentation on the local ROI, extract the local image feature using an additional encoder, and perform positional encoding on the local image feature using a vascular centerline; and a fused feature formation unit 15 configured to, fuse the local image feature with the global image feature using an attention mechanism to form the fused image feature.

As shown in FIG. 7, in one embodiment of this disclosure, the decoder 20 includes:

a segmentation task provision unit 21 configured to, provide a segmentation decoding branch reflecting the vascular morphological task, and provide a segmentation decoder corresponding to a same level encoder in the segmentation decoding branch; and a prediction task provision unit 22 configured to, provide a prediction decoding branch reflecting the hemodynamic functional task, and provide a prediction decoder corresponding to a same level encoder in the prediction decoding branch.

As shown in FIG. 7, in one embodiment of this disclosure, the bi-directional correction decoder 30 includes:

a forward correction unit 31 configured to, establish a forward correction process between two decoders corresponding to the task type of the decoding branch to correct a functional feature based on a morphological feature; and a reverse correction unit 32 configured to, meanwhile, establish a reverse correction process between the two decoders to correct the morphological feature based on the functional feature.

As shown in FIG. 7, in one embodiment of this disclosure, the bi-directional correction decoder 30 further includes:

a forward correction enhancement unit 31*a* configured to, establish a forward correction process between the two decoders corresponding to the task type of the decoding branch based on the morphological feature and a vascular centerline distance heatmap to correct the functional feature; and a reverse correction enhancement unit 12*a* configured to, meanwhile, establish a reverse correction process between the two decoders to correct the morphological feature based on the functional feature and a hemodynamic direction of the vascular centerline guidance.

As shown in FIG. 7, in one embodiment of this disclosure, the bi-directional correction decoder 30 further includes:

a gated switch unit 33 configured to, provide a measurement threshold for average confidence of the morphological feature during a gated judgment process, and determine whether to activate the bi-directional feature correction process based on a measurement result.

As shown in FIG. 7, in one embodiment of this disclosure, the bi-directional correction decoder 30 further includes:

a confidence acquisition unit 34 configured to, obtain a morphological feature to be corrected, a functional feature to be corrected, a control segmentation feature, and a control function feature, and form a confidence map and the average confidence based on the control function feature;

a feature direct connection unit 35 configured to, in the case that the average confidence is greater than the measurement threshold, directly output the morphological feature to be corrected and the functional feature to be corrected from the segmentation decoder and the prediction decoder, respectively; and a bi-directional correction execution unit 36 configured to, in the case that the average confidence is less than the measurement threshold, activate the bi-directional feature correction process.

As shown in FIG. 7, in one embodiment of this disclosure, it further includes:

a physical constraint formation module 40 configured to, use vascular morphological parameters and hemodynamic functional parameters obtained from the decoding branches of the two task types as independent variables of physical constraint conditions, determine a physical constraint loss function as a component of a total loss function based on a residual between a predicted value of a dependent variable and a true value of the dependent variable under the physical constraint conditions, and optimize the decoder and the bi-directional feature correction process through gradient backpropagation of the total loss function.

As shown in FIG. 7, in one embodiment of this disclosure, the physical constraint formation module 40 includes:

a segmentation loss formation unit 41 configured to, determine a segmentation loss function based on a residual between a prediction result of a segmentation task and a segmentation true value;

a prediction loss formation unit 42 configured to, determine a prediction loss function based on a residual between a prediction result of a prediction task and a predicted true value;

a physical constraint loss formation unit 43 configured to, select a segmentation task and a CTFFR prediction task, use a segmentation task result to obtain vascular radius parameters and obtain pressure differential parameters from a CTFFR prediction task result, use the vascular radius parameters and the pressure differential parameters to obtain a predicted blood flow value through a Poiseuille flow equation, use the vascular radius parameters and the pressure differential parameters to form a vascular blood flow true value through a fluid continuity equation, and determine the physical constraint loss function based on a residual between the predicted blood flow value and the vascular blood flow true value; and an iterative optimization unit 44 configured to, form a total loss based on segmentation loss, prediction loss, and physical constraint loss, and optimize network parameters of the decoder and the bi-directional feature correction process through the gradient backpropagation using the total loss function.

Figure 8:
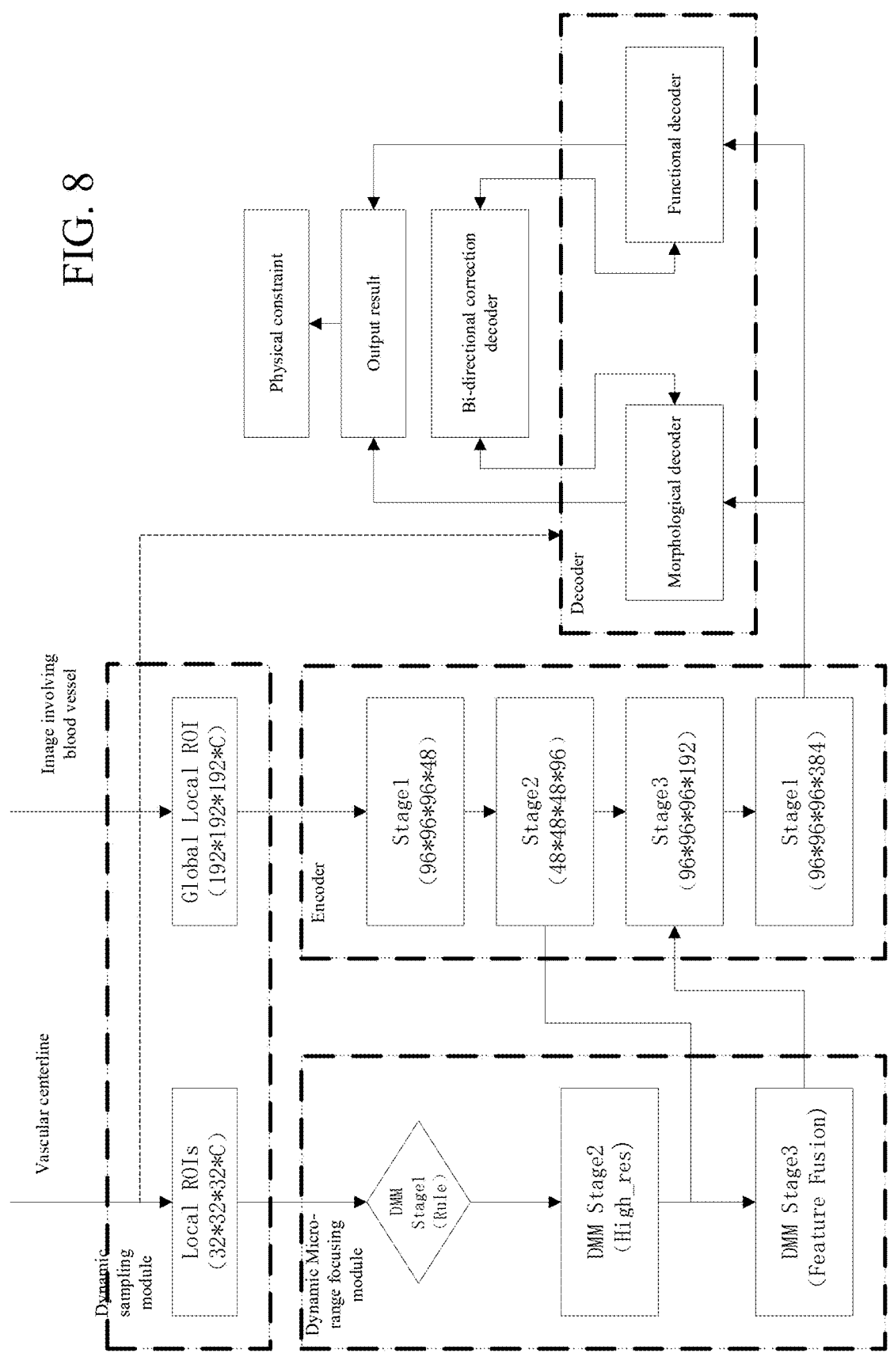
FIG. 8 shows a schematic diagram of a network structure of a deep learning apparatus for task joint optimization based on vascular centerline guidance, provided in one embodiment of this disclosure.

A network structure of a deep learning apparatus for task joint optimization based on vascular centerline guidance in one embodiment of this disclosure is shown in FIG. 8. In FIG. 8, this embodiment includes:

a dynamic sampling module (DSW) configured to, sample data of the local ROI and the global ROI formed using the vascular centerline for a vascular related image;

a dynamic micro-range focusing module (DMM) configured to, perform up-sampling (High_des) and data augmentation on the selected local ROI based on the judgment rule (Rule) to extract the local image feature and fuse it with the global image feature (Feature Fusion);

an encoder configured to, perform global image feature extraction (down-sampling) on the global ROI;

a decoder configured to, form different decoding branches for different task types, and decode fused image features; and a bi-directional correction decoder (BDC Decoder) configured to, in any pair of decoding branches in two task types, form the bi-directional feature correction process using an output feature of one decoder to correct an output feature of the other decoder between the decoders of the two task types.

In one embodiment of this disclosure, the decoder includes a morphological decoder and a functional decoder. The decoder is configured based on the task type to decode the fused image feature, forming at least one decoding branch for the vascular morphological task and at least one decoding branch for the hemodynamic functional task.

The deep learning apparatus for the task joint optimization based on the vascular centerline guidance in the embodiments of this disclosure forms the network structure based on the encoder and the decoder. By using a correlation extraction structure between a global feature and a local feature formed by the vascular centerline during the encoding process, a balance between accuracy and efficiency is achieved in detailed vascular feature extraction. By forming the bi-directional correction process of the same level decoder features by the bi-directional correction decoders between decoding branch structures composed of the decoders, and using hemodynamic functional status that has the prior correlation with the vascular morphology to establish the joint analysis means for the vascular morphology, the joint promotion of the vascular morphology and the functional analysis has been achieved. Physical consistency between anatomical reconstruction and functional prediction has been ensured.

Figure 9:
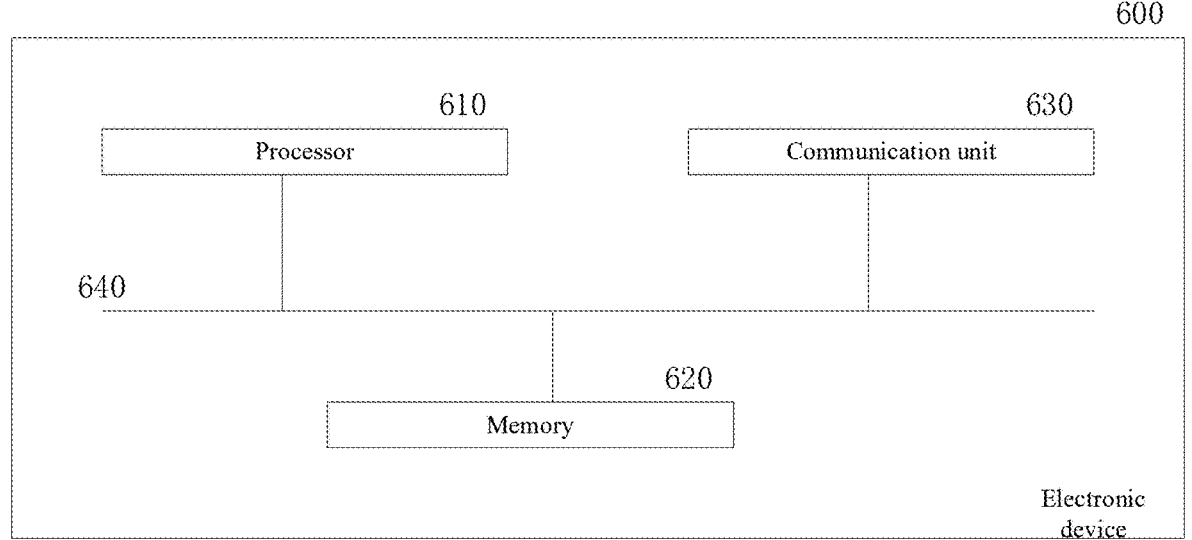
FIG. 9 shows a structural schematic diagram of an electronic device, provided in one embodiment of this disclosure.

The embodiments of this disclosure further provide a specific implementation manner of an electronic device capable of implementing all steps of the method in the above embodiments, as shown in FIG. 9. An electronic device 600 specifically includes the following content:

a processor 610, a memory 620, a communication unit 630, and a bus 640;

among them, the processor 610, the memory 620, and the communication unit 630 communicate with each other through the bus 640; and the communication unit 630 is configured to achieve information transmission between a server-side device and a terminal device and other related devices.

The processor 610 is configured to call a computer program in the memory 620, and when the processor executes the computer program, all steps of the deep learning method for the task joint optimization based on the vascular centerline guidance in the above embodiments are implemented.

Those ordinal skilled in the art should understand that the memory may be, but is not limited to, random access memory (RAM), read only memory (ROM), programmable read only memory (PROM), erasable programmable read only memory (EPROM), electric erasable programmable read only memory (EEPROM), and the like. Among them, the memory is configured to store a program, and the processor executes the program after receiving execution instructions. Furthermore, a software program and module in the above memory may further include an operating system, which may include various software components and/or drivers for managing system tasks such as memory management, storage device control, power management, and the like, and may communicate with various hardware or software components to provide a runtime environment for other software components.

The processor may be an integrated circuit chip with signal processing capabilities. The above processor may be a general-purpose processor, including a central processing unit (CPU), a network processor (NP), and the like. Disclosed methods, steps, and logical diagrams in the embodiments of this disclosure may be implemented or executed. The general-purpose processor may be a microprocessor or any conventional processor.

This disclosure further provides a computer-readable storage medium including a program, which, when executed by a processor, is configured to perform the deep learning method for the task joint optimization based on the vascular centerline guidance provided by any of the aforementioned method embodiments.

Those ordinal skilled in the art should understand that all or part of steps for implementing each of the above method embodiments may be completed through hardware related to program instructions. The aforementioned program may be stored in a computer-readable storage medium. The program, when executed, performs steps including each of the above method embodiments. The aforementioned storage medium may be ROM, RAM, disk or CD and other kinds of media that may store program codes, and a specific type of the medium is not limited by this disclosure.

The above are only preferred specific implementation manners of this disclosure, but a protection scope of this disclosure is not limited thereto. Any changes or substitutions that can be easily conceived by those skilled in the art within a technical scope disclosed by this disclosure should be covered within the protection scope of this disclosure. Therefore, the protection scope of this disclosure should be based on the protection scope of claims.

The invention claimed is:

1. A deep learning method for joint optimization based on vascular centerline guidance, comprising:

in a process of extracting a global image feature by an encoder, extracting a local image feature after performing data augmentation on a local image with morphological specificity based on the vascular centerline guidance, and fusing the local image feature with the global image feature to form a fused image feature; and forming a bi-directional feature correction process between decoders of different decoding branches.

2. The deep learning method according to claim 1, wherein the forming the bi-directional feature correction process between the decoders of different decoding branches comprises:

configuring a decoder based on a task type to decode the fused image feature, and forming at least one decoding branch for a vascular morphological task and at least one decoding branch for a hemodynamic functional task; and in any pair of decoding branches in two task types, forming the bi-directional feature correction process using an output feature of one decoder to correct an output feature of the other decoder between the decoders of the two task types.

3. The deep learning method according to claim 1, wherein the forming the fused image feature comprises:

performing global sampling on an input image containing a blood vessel to form a global ROI based on the vascular centerline guidance;

extracting the global image feature from the global ROI by the encoder;

determining position attention information based on a vascular specificity judgment rule in the global ROI, and performing local sampling to form a local ROI dataset based on the position attention information in the global ROI;

after performing up-sampling and the data augmentation on the local ROI, extracting the local image feature using an additional encoder, and performing positional encoding on the local image feature using a vascular centerline; and fusing the local image feature with the global image feature using an attention mechanism to form the fused image feature.

4. The deep learning method according to claim 3, wherein the vascular specificity judgment rule comprises judging vascular stenosis rate, vascular bifurcation, and vascular curvature.

5. The deep learning method according to claim 3, wherein replace the determining the position attention information based on the vascular specificity judgment rule in the global ROI, and the performing the local sampling to form the local ROI dataset based on the position attention information in the global ROI by:

adjusting the local ROI to perform the local sampling to form the local ROI dataset in the global ROI, and determining the position attention information of the local ROI containing specific vascular morphology based on the vascular specificity judgment rule.

6. The deep learning method according to claim 3, wherein the up-sampling is provided based on a resolution level of fusion of the local image feature and the global image feature.

7. The deep learning method according to claim 3, wherein the additional encoder adopts cascaded 3D convolution to extract the local feature and fuse it with positional encoding of a vascular centerline point to obtain the local image feature.

8. The deep learning method according to claim 3, wherein a size of the local ROI is dynamically adjusted based on the vascular specificity judgment rule.

9. The deep learning method according to claim 3, wherein the vascular centerline comprises stenosis information, obtained by one of the following methods:

in the case that the centerline is known, obtain a cross-sectional diameter adopting cross-sectional 2D-Unet segmentation, and calculate stenosis degree along the centerline, and in the case that the centerline is unknown, segment an entire image and extract coordinates of the centerline adopting lightweight 3D-Unet, and calculate vascular stenosis along the centerline.

10. The deep learning method according to claim 2, wherein the configuring the decoder based on the task type to decode the fused image feature, and the forming the at least one decoding branch for the vascular morphological task and the at least one decoding branch for the hemodynamic functional task comprise:

providing a segmentation decoding branch reflecting the vascular morphological task, and providing a segmentation decoder corresponding to a same level encoder in the segmentation decoding branch, wherein the vascular morphological task comprises at least one of contour, inner diameter, inner wall mask, or topological shape; and providing a prediction decoding branch reflecting the hemodynamic functional task, and providing a prediction decoder corresponding to a same level encoder in the prediction decoding branch, wherein the hemodynamic functional task comprises at least one of blood pressure parameters, blood flow parameters, and CTFFR.

11. The deep learning method according to claim 2, wherein input features of the bi-directional feature correction process comprise a feature output of a same level decoder as a corrected feature, and further comprise a feature output of a same level decoder as a control feature, a feature output of a preceding level decoder, or a down-sampling feature output of a final output result of a task, and then an interactive judgment is formed using the control feature to control the bi-directional feature correction process.

12. The deep learning method according to claim 2, wherein the bi-directional feature correction process comprises:

establishing a forward correction process between two decoders corresponding to the task type of the decoding branch to correct a functional feature based on a morphological feature; and meanwhile, establishing a reverse correction process between the two decoders to correct the morphological feature based on the functional feature.

13. The deep learning method according to claim 12, wherein the forward correction process comprises:

generating a spatial attention weight based on a segmentation confidence map of the morphological feature, and dynamically modulating a functional feature map to obtain a corrected functional feature.

14. The deep learning method according to claim 12, wherein the reverse correction process comprises:

correcting the morphological feature based on changes in the functional feature (such as in a gradient direction) to obtain a corrected morphological feature.

15. The deep learning method according to claim 2, wherein the forming the bi-directional feature correction process comprises:

establishing a forward correction process between the two decoders corresponding to the task type of the decoding branch based on the morphological feature and a vascular centerline distance heatmap to correct the functional feature; and meanwhile, establishing a reverse correction process between the two decoders to correct the morphological feature based on the functional feature and a hemodynamic direction of the vascular centerline guidance.

16. The deep learning method according to claim 2, wherein the forming the bi-directional feature correction process comprises:

providing a measurement threshold for average confidence of the morphological feature during a gated judgment process, and determining whether to activate the bi-directional feature correction process based on a measurement result.

17. The deep learning method according to claim 16, wherein the providing the measurement threshold for the average confidence of the morphological feature during the gated judgment process, and the determining whether to activate the bi-directional feature correction process based on the measurement result comprise:

obtaining a morphological feature to be corrected, a functional feature to be corrected, a control segmentation feature, and a control function feature, and forming a confidence map and the average confidence based on the control function feature;

in the case that the average confidence is greater than the measurement threshold, directly outputting the morphological feature to be corrected and the functional feature to be corrected from the segmentation decoder and the prediction decoder, respectively; and in the case that the average confidence is less than the measurement threshold, activating the bi-directional feature correction process.

18. The deep learning method according to claim 16, wherein the forming the bi-directional feature correction process comprises:

outputting a confidence map (Conf Map) of a determined channel and the vascular centerline distance heatmap or performing 3×3×3 convolution on the control function feature (F_control) based on confidence map (Conf Map) and the vascular centerline distance heatmap to form functional correction data;

outputting a functional gradient (FFR Grad) of a same channel and overlaying with the hemodynamic direction of the vascular centerline guidance or performing the 3×3×3 convolution on a control separation feature (S_control) based on the functional gradient (FFR Grad) and the hemodynamic direction of the vascular centerline guidance to form morphological correction data;

correcting the morphological feature to be corrected (S_feat) based on the morphological correction data to form a corrected morphological feature (S_feat_cor); and correcting the functional feature to be corrected (F_feat) based on the functional correction data to form a corrected functional feature (F_feat_cor).

19. The deep learning method according to claim 2, further comprising:

using vascular morphological parameters and hemodynamic functional parameters obtained from the decoding branches of the two task types as independent variables of physical constraint conditions, determining a physical constraint loss function as a component of a total loss function based on a residual between a predicted value of a dependent variable and a true value of the dependent variable under the physical constraint conditions, and optimizing the decoder and the bi-directional feature correction process through gradient backpropagation of the total loss function.

20. The deep learning method according to claim 19, wherein the determining the physical constraint loss function as the component of the total loss function, and the optimizing the decoder and the bi-directional feature correction process through the gradient backpropagation of the total loss function comprise:

determining a segmentation loss function based on a residual between a prediction result of a segmentation task and a segmentation true value;

determining a prediction loss function based on a residual between a prediction result of a prediction task and a predicted true value;

selecting a segmentation task and a CTFFR prediction task, using a segmentation task result to obtain vascular radius parameters and obtain pressure differential parameters from a CTFFR prediction task result, using the vascular radius parameters and the pressure differential parameters to obtain a predicted blood flow value through a Poiseuille flow equation, using the vascular radius parameters and the pressure differential parameters to form a vascular blood flow true value through a fluid continuity equation, and determining the physical constraint loss function based on a residual between the predicted blood flow value and the vascular blood flow true value; and forming a total loss based on segmentation loss, prediction loss, and physical constraint loss, and optimizing network parameters of the decoder and the bi-directional feature correction process through the gradient backpropagation using the total loss function.

21. A deep learning apparatus for joint optimization based on vascular centerline guidance, comprising:

an encoder configured to, in a process of extracting a global image feature by an encoder, extract a local image feature after performing data augmentation on a local image with morphological specificity based on the vascular centerline guidance, and fuse the local image feature with the global image feature to form a fused image feature; and a decoder correction module configured to, form a bi-directional feature correction process between decoders of different decoding branches.

22. The deep learning apparatus according to claim 21, wherein the decoder correction module comprises:

a decoder configured to, configure a decoder based on a task type to decode the fused image feature, and form at least one decoding branch for a vascular morphological task and at least one decoding branch for a hemodynamic functional task; and a bi-directional correction decoder configured to, in any pair of decoding branches in two task types, form the bi-directional feature correction process using an output feature of one decoder to correct an output feature of the other decoder between the decoders of the two task types.

23. The deep learning apparatus according to claim 22, further comprising:

a physical constraint formation module configured to, use vascular morphological parameters and hemodynamic functional parameters obtained from the decoding branches of the two task types as independent variables of physical constraint conditions, determine a physical constraint loss function as a component of a total loss function based on a residual between a predicted value of a dependent variable and a true value of the dependent variable under the physical constraint conditions, and optimize the decoder and the bi-directional feature correction process through gradient backpropagation of the total loss function.

24. An electronic device, comprising:

a processor, a memory, and an interface for communication with a gateway, wherein the memory is configured to store a program and data, and the processor calls the program stored in the memory to perform the method according to claim 1.

25. A non-transitory computer-readable storage medium, wherein the computer-readable storage medium comprises a program, which, when executed by a processor, is configured to perform the method according to claim 1.

* * * * *